United States Patent
Yanagisawa

(10) Patent No.: US 10,311,125 B2
(45) Date of Patent: Jun. 4, 2019

(54) SIMPLIFYING CLAUSES FOR MAX-SAT

(71) Applicant: INTERNATIONAL BUSINESS MACHINES CORPORATION, Armonk, NY (US)

(72) Inventor: Hiroki Yanagisawa, Tokyo (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 15/213,884

(22) Filed: Jul. 19, 2016

(65) Prior Publication Data
US 2018/0024967 A1 Jan. 25, 2018

(51) Int. Cl.
G06F 17/11 (2006.01)
G06F 7/544 (2006.01)

(52) U.S. Cl.
CPC .......... *G06F 17/11* (2013.01); *G06F 7/5443* (2013.01); *G06F 2207/544* (2013.01)

(58) Field of Classification Search
CPC .......................................... G06F 17/10–17/11
See application file for complete search history.

(56) References Cited

U.S. PATENT DOCUMENTS

| | | | |
|---|---|---|---|
| 2009/0125766 A1* | 5/2009 | Safarpour | G06F 17/504 714/724 |
| 2012/0331115 A1* | 12/2012 | Narain | H04L 41/0813 709/220 |
| 2016/0179471 A1* | 6/2016 | Shiraga | G06F 17/11 708/603 |
| 2017/0185565 A1* | 6/2017 | Yanagisawa | G06F 17/11 |

OTHER PUBLICATIONS

Li, C. M. et al., "New Inference Rules for Max-SAT" Journal of Artificial Intelligence Research (2007) pp. 321-359, vol. 30.
Heras, F. et al., "New Inference Rules for Efficient Max-SAT Solving" Proceedings of the 21st national conference on Artificial intelligence (2006) pp. 68-73, vol. 1.

* cited by examiner

*Primary Examiner* — Matthew D Sandifer
(74) *Attorney, Agent, or Firm* — Tutunjian & Bitetto, P.C.; Vazken Alexanian

(57) ABSTRACT

A method includes obtaining a plurality of clauses associated with a plurality of logical variables, each of the clauses consisting of a weight and a disjunction of one or more literals of the logical variables, detecting conditions associated with one or more inference rules, and simplifying the plurality of clauses on the basis of the detecting.

20 Claims, 16 Drawing Sheets

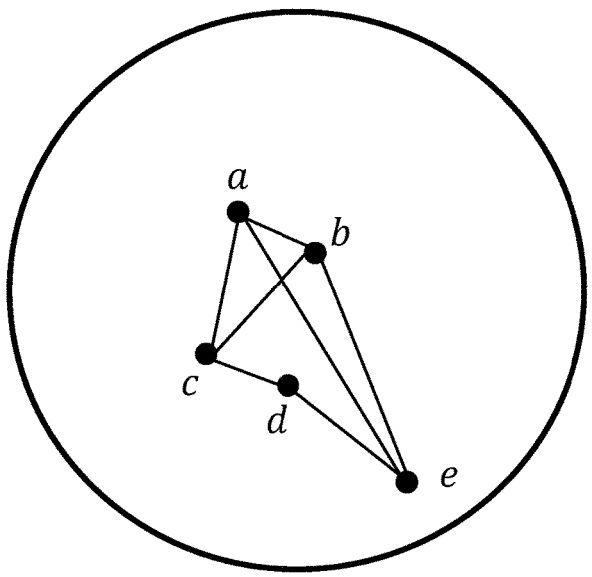

| Variable | Clauses |
|---|---|
| $a$ | $(a \lor b, w_{ab}), (\overline{a} \lor \overline{b}, w_{ab}), (a \lor c, w_{ac}), (\overline{a} \lor \overline{c}, w_{ac}),$ $(a \lor e, w_{ae}), (\overline{a} \lor \overline{e}, w_{ae})$ |
| $b$ | $(a \lor b, w_{ab}), (\overline{a} \lor \overline{b}, w_{ab}), (b \lor c, w_{bc}), (\overline{b} \lor \overline{c}, w_{bc}),$ $(b \lor e, w_{be}), (\overline{b} \lor \overline{e}, w_{be})$ |
| $c$ | $(a \lor c, w_{ac}), (\overline{a} \lor \overline{c}, w_{ac}), (b \lor c, w_{bc}), (\overline{b} \lor \overline{c}, w_{bc}),$ $(c \lor d, w_{cd}), (\overline{c} \lor \overline{d}, w_{cd})$ |
| $d$ | $(c \lor d, w_{cd}), (\overline{c} \lor \overline{d}, w_{cd}), (d \lor e, w_{de}), (\overline{d} \lor \overline{e}, w_{de})$ |
| $e$ | $(a \lor e, w_{ae}), (\overline{a} \lor \overline{e}, w_{ae}), (b \lor e, w_{be}), (\overline{b} \lor \overline{e}, w_{be}),$ $(d \lor e, w_{de}), (\overline{d} \lor \overline{e}, w_{de})$ |

*FIG. 6*

| Variable | Clauses |
|---|---|
| $a$ | $(\bar{a}, 1), (a \vee b, H), (a \vee c, H), (a \vee e, H)$ |
| $b$ | $(\bar{b}, 1), (a \vee b, H), (b \vee c, H), (b \vee e, H)$ |
| $c$ | $(\bar{c}, 1), (a \vee c, H), (b \vee c, H), (c \vee d, H)$ |
| $d$ | $(\bar{d}, 1), (c \vee d, H), (d \vee e, H)$ |
| $e$ | $(\bar{e}, 1), (a \vee e, H), (b \vee e, H), (d \vee e, H)$ |

SIMPLIFYING CLAUSES FOR MAX-SAT

BACKGROUND

Technical Field

The present invention relates to simplifying clauses associated with logical variables for the purpose of solving a maximum satisfiability problem (MAX-SAT).

Description of the Related Art

An instance of MAX-SAT is a set of clauses associated with logical variables, where each of the clauses consists of a weight and a disjunction of one or more literals of the logical variables. A solution to the MAX-SAT instance is an assignment of values (TRUE or FALSE) to the variables that maximizes the sum of the weights of clauses satisfied by the assignment. When solving a MAX-SAT instance, inference rules are often used to simplify the set of clauses. Many such inference rules decide the value of a variable in a solution. See, for example, Larrosa, Javier et al. "A logical approach to efficient Max-SAT solving." *Artif. Intell.* 172 (2008): 204-233; Li, Chu Min et al. "New Inference Rules for Max-SAT." Journal of Artificial Intelligence Research, Volume 30 Issue 1, September 2007, 321-359, 2007-09-01, ISSN: 1076-9757; and Heras, Federico et al. "New Inference Rules for Efficient Max-SAT Solving." AAAI'06 Proceedings of the 21st national conference on Artificial intelligence—Volume 1, 68-73, 2006-07-16, ISBN: 978-1-57735-281-5.

Practical applications of MAX-SAT are becoming increasingly numerous and diverse. For example, in addition to having applications in software package upgrading, software engineering, formal verification, software product lines, and bioinformatics, MAX-SAT is becoming a core component in cognitive applications. In view of such applicability, use of MAX-SAT is becoming increasingly widespread. However, actually solving a MAX-SAT instance requires significant time and resources (e.g. memory, processor load, etc.), even when existing inference rules are applied.

Meanwhile, MAX-SAT solvers exist, such as the open source SAT4J solver obtainable on the World Wide Web at sat4j.org, which can be used to solve MAX-SAT instances in many different fields. However, MAX-SAT solvers consume significant time and resources to find a solution to a MAX-SAT instance.

SUMMARY

Therefore, it is an object of an aspect of the innovations herein to provide a method capable of overcoming the above drawbacks accompanying the related art. The above and other objects can be achieved by the combinations recited in the claims. A first aspect of the innovations herein may include a method including obtaining a plurality of clauses associated with a plurality of logical variables, each of the clauses consisting of a weight and a disjunction of one or more literals of the logical variables, detecting (i) whether any clauses in the plurality of clauses other than a first clause $(a \lor b, w_{11})$, a second clause $(\bar{a} \lor \bar{b}, w_{12})$, a third clause $(a \lor c, w_{21})$, a fourth clause $(\bar{a} \lor \bar{c}, w_{22})$, and a fifth clause $(a, w_0)$, where a is a first logical variable, b is a second logical variable, c is a third logical variable, and $w_{11}, w_{12}, w_{21},$ and $w_{22}$ are weights, contain a literal of the first logical variable a and a non-zero weight and (ii) whether $\min(w_{11}, w_{12}) \geq w_0 + \max(w_{21}, w_{22})$, and simplifying the plurality of clauses on the basis of the detecting. The simplifying may include modifying the plurality of clauses according to the assumption that $a \neq b$ if the detecting indicates (i) that no clauses in the plurality of clauses other than the first, second, third, fourth, and fifth clauses contain a literal of the first logical variable a and a non-zero weight and (ii) that $\min(w_{11}, w_{12}) \geq w_0 + \max(w_{21}, w_{22})$.

A second aspect of the innovations herein may include a computer readable storage medium having instructions embodied therewith, the instructions executable by a processor to cause the processor to perform operations corresponding to the steps of the method of the first aspect.

A third aspect of the innovations herein may include an apparatus including the above computer readable storage medium of the second aspect and a processor operable to execute the instructions.

A fourth aspect of the innovations herein may include a method including obtaining a plurality of clauses associated with a plurality of logical variables, each of the clauses consisting of a weight and a disjunction of one or more literals of the variables, detecting (i) whether the plurality of clauses includes a first clause $(a \lor b, H)$ and a second clause $(a \lor c, H)$, where a is a first logical variable, b is a second logical variable, c is a third logical variable, and a weight of H signifies a hard clause that must be satisfied by any assignment of values to the plurality of logical variables, (ii) whether any hard clauses in the plurality of clause other than the first and second clauses contain the literal a, and (iii) whether $w_{unit}(\bar{a}) + w_{unit}(b) \geq X_b$ and $w_{unit}(\bar{a}) + w_{unit}(c) \geq X_c$, where $w_{unit}(\bar{a})$ is the weight $w_1$ of a clause $(\bar{a}, w_1)$ included in the plurality of clauses, $w_{unit}(b)$ is the weight $w_2$ of a clause $(b, w_2)$ included in the plurality of clauses, $w_{unit}(c)$ is the weight $w_3$ of a clause $(c, w_3)$ included in the plurality of clauses, $X_b$ is the sum of the weights of all clauses in the plurality of clauses, other than hard clauses containing the literal a, that contain at least one of the literals a and $\bar{b}$, and $X_c$ is the sum of the weights of all clauses in the plurality of clauses, other than hard clauses containing the literal a, that contain at least one of the literals a and $\bar{c}$, and simplifying the plurality of clauses on the basis of the detecting. The simplifying may include modifying the plurality of clauses according to the assumption that b=c if the detecting indicates (i) that the plurality of clauses includes the first and second clauses, (ii) that no hard clauses in the plurality of clauses other than the first and second clauses contain the literal a, and (iii) that $w_{unit}(\bar{a}) + w_{unit}(b) \geq X_b$ and $w_{unit}(\bar{a}) + w_{unit}(c) \geq X_c$.

A fifth aspect of the innovations herein may include a computer readable storage medium having instructions embodied therewith, the instructions executable by a processor to cause the processor to perform operations corresponding to the steps of the method of the fourth aspect.

A sixth aspect of the innovations herein may include an apparatus including the above computer readable storage medium of the fifth aspect and a processor operable to execute the instructions.

The summary clause does not necessarily describe all of the features of the embodiments of the present invention. The present invention may also be a combination or sub-combination of the features described above, including a combination of features from two or more of the aspects described above. The above and other features and advantages of the present invention will become more apparent from the following description of the embodiments, taken in conjunction with the accompanying drawings.

BRIEF DESCRIPTION OF THE DRAWINGS

FIG. 6 shows an example graph, along with a corresponding example representation of a data structure.

DETAILED DESCRIPTION

Hereinafter, example embodiments of the present invention will be described. The embodiments should not be construed as limiting the scope of the invention, which is defined by the claims. The combinations of features described in the embodiments are not necessarily essential to the invention.

Figure 1:
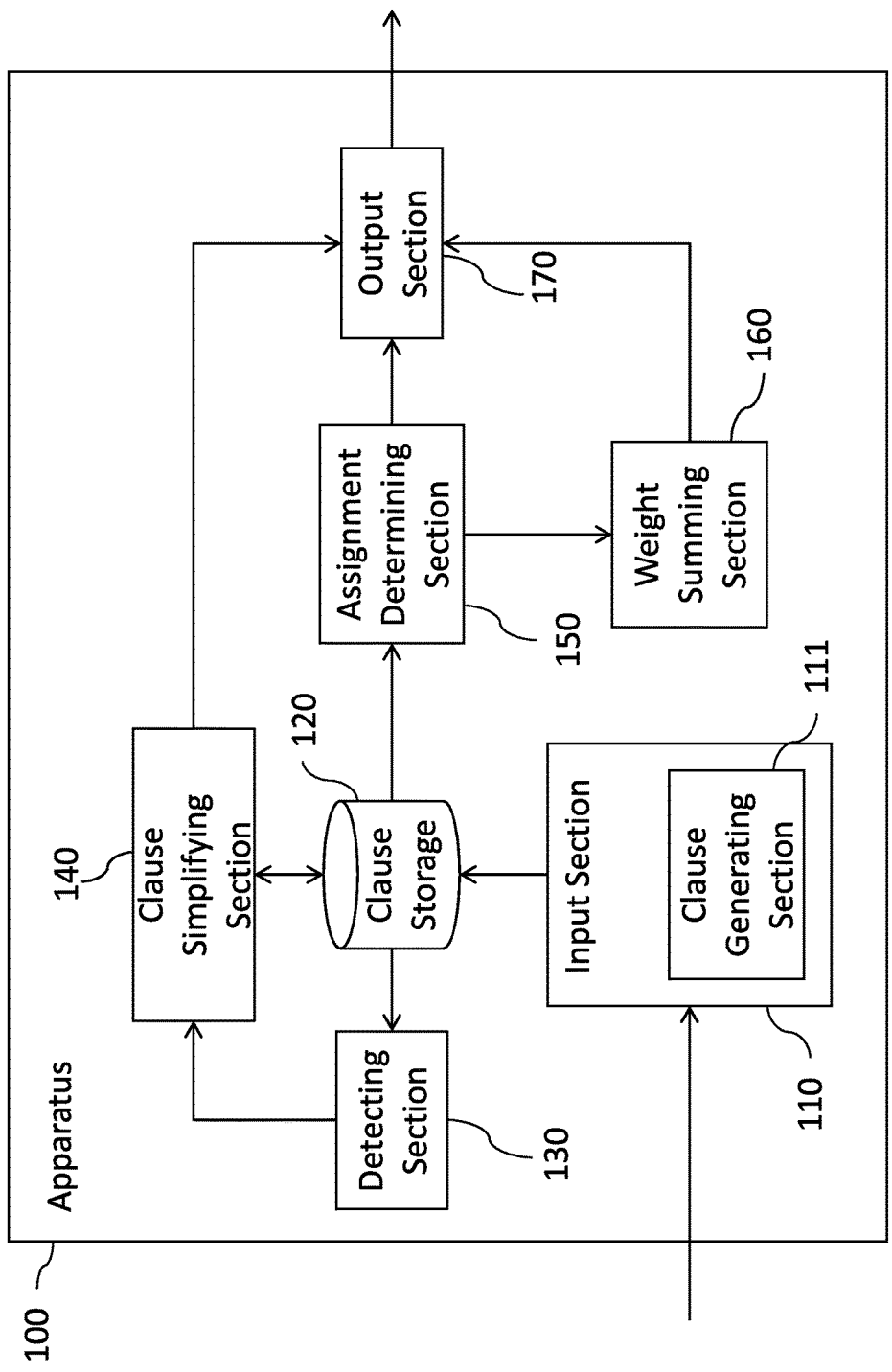
FIG. 1 shows an apparatus 100 according to an embodiment of the present invention.

FIG. 1 shows an apparatus 100 according to an embodiment of the present invention. The apparatus 100 obtains a set of clauses representing a MAX-SAT instance and applies one or more inference rules. In accordance with the inference rules, the apparatus 100 detects various conditions and simplifies the clauses on the basis of the detection results. Using the simplified clauses, the apparatus 100 may then solve the MAX-SAT instance by determining an optimal assignment of values to the variables and sum the weights of clauses satisfied or unsatisfied by the optimal assignment. The apparatus 100 includes an input section 110, a clause storage 120, a detecting section 130, a clause simplifying section 140, an assignment determining section 150, a weight summing section 160, and an output section 170.

The input section 110, obtains a plurality of clauses associated with a plurality of logical variables, each of the clauses consisting of a weight and a disjunction of one or more literals of the logical variables. Each of the clauses may take the form (Z, w), where Z is the disjunction of one or more literals and w is the weight of the clause. Examples of clauses associated with the logical variables $x_1$, $x_2$, and $x_3$ are $(x_1 \lor x_2, w_1)$, $(\overline{x_1} \lor \overline{x_2} \lor x_3, w_2)$, $(\overline{x_3}, w_3)$, $(T, w_4)$, etc., where "$\lor$" is the symbol for disjunction (i.e. "OR"), the "literals" of a logical variable x refer to x and its negation $\overline{x}$, and "T" signifies a tautologically satisfied disjunction that is satisfied by any assignment of values to the plurality of logical variables. The weight w may be any non-negative number or "H", where a weight of H signifies a hard clause that must be satisfied by any assignment of values to the logical variables. In this specification, a clause with weight w=0 is considered equivalent to the non-existence of the clause. Thus, generally, whether a clause of unspecified weight "exists" in a set of clauses is not meaningful, whereas the existence of a clause with specified non-zero weight is meaningful.

In some applications of MAX-SAT, the plurality of clauses may be associated with a graph having a plurality of vertices and a plurality of weighted edges connecting the vertices, such that each vertex of the plurality of vertices is represented by one of the logical variables. The graph may represent an arrangement of elements in a system. Non-limiting examples of systems include a computer system in which the elements may be processing elements, a communication network in which the elements may be communicating devices, a query execution system, a real or virtual structure or model, a process flow in which the elements are computation, decision, or other process nodes, or generally any spatial, temporal, or conceptual arrangement of components or items of information having a real-world application in a technical, business, or other practical setting.

In the example of the apparatus 100 shown in FIG. 1, the input section 110 includes a clause generating section 111. The input section 110 may receive the graph from outside the apparatus 100. For example, the graph can be received from an external storage or received from a computer or server through a network such as the Internet, WAN, and/or LAN. The clause generating section 111 may then generate the plurality of clauses based on the graph received from outside the apparatus. In this way, the input section 110 may obtain a plurality of clauses by generating the plurality of clauses based on an input graph. Alternatively or additionally, the input section 110 may obtain a plurality of clauses by receiving the plurality of clauses from outside the apparatus 100 in the same ways that the graph may be received. For example, the plurality of clauses can be received from an external storage or received from a computer or server through a network such as the Internet, WAN, and/or LAN. In a case where the input section 110 only receives clauses from outside the apparatus 100, the clause generating section 111 can be omitted.

The input section 110 may receive data including a graph and/or a plurality of clauses through any combination of input device(s). For example, the input section 110 may be configured to receive mouse input, keyboard input, touch-screen input, eye tracking input, voice commands, and/or gestures. The input section 110 may receive the data from a remote user terminal or a remote user device.

The clause storage 120 stores the plurality of clauses obtained by the input section 110. The clause storage 120 may store the plurality of clauses after one or more modifications have been applied to the plurality of clauses by the apparatus 100. The clause storage 120 may store modified versions of the plurality of clauses in place of previous versions or in addition to previous versions.

The detecting section 130 detects various conditions of the plurality of clauses stored in the clause storage 120 in accordance with inference rules.

The clause simplifying section 140 simplifies the plurality of clauses stored in the clause storage 120 on the basis of the detecting by the detecting section 130. The simplifying may include modifying the plurality of clauses according to assumptions that can be made on the basis of inference rules. For example, the clause simplifying section 140 may receive a detection result from the detecting section 130, obtain the plurality of clauses stored in the clause storage 120, and simplify the plurality of clauses to produce a simplified plurality of clauses based on the detection result. The clause simplifying section 140 may then store the simplified plurality of clauses in the clause storage 120 and/or provide the simplified plurality of clauses to the output section 170. A simplified plurality of clauses output by the output section 170 in this way can be used downstream of the apparatus 100, for example, by a separate MAX-SAT solver.

Depending on the detection results, the assumptions allowed by inference rules may or may not apply. In this specification, the meaning of simplifying the plurality of clauses on the basis of the detecting includes the meaning of simplifying or not depending on the detection result. In other words, if the clause simplifying section 140 receives a detection result and, in response to conditions being unmet, leaves the plurality of clauses unchanged, it can still be said that the clause simplifying section 140 simplified the plurality of clauses on the basis of the detecting. Likewise, the simplified plurality of clauses produced by the clause simplifying section 140 may be identical to the original plurality of clauses. That is, a plurality of clauses can be said to be a "simplified" plurality of clauses by virtue of the fact that detection results were checked and acted on by simplifying the clauses if appropriate.

The assignment determining section 150 determines, based on the simplified plurality of clauses, an optimal assignment of values to the plurality of logical variables, the optimal assignment of values determined so as to maximize the sum of the weights of clauses satisfied by the assignment. The assignment determining section 150 may determine one or more optimal assignments of values using known computational methods of MAX-SAT solvers, for example, the computational method of the open source SAT4J solver obtainable on the World Wide Web at sat4j.org. The assignment determining section 150 may provide the one or more optimal assignments of values to the output section 170.

The weight summing section 160 may sum the weights of clauses satisfied by the optimal assignment of values determined by the assignment determining section 150, the resulting sum representing the benefit of the optimal assignment of values. Alternatively, or additionally, the weight summing section 160 may sum the weights of clauses not satisfied by the optimal assignment of values determined by the assignment determining section 150, the resulting sum representing the cost of the optimal assignment of values. In order to sum the weights, the weight summing section 160 may receive the plurality of clauses along with optimal assignment of values from the assignment determining section 150 as shown in FIG. 1. Alternatively, the weight summing section 160 may receive only the optical assignment of values from the assignment determining section 150 and may obtain the plurality of clauses directly from the clause storage 120. The weight summing section 160 may provide the sum(s) to the output section 170.

The output section 170 outputs one or more of the various outputs of the apparatus 100 for use by a downstream device or user. For example, the outputs may be stored, uploaded to a server, printed, displayed on a screen, or otherwise made available for viewing or analysis. The various outputs of the apparatus 100 output by the output section 170 may include, for example, the simplified plurality of clauses produced by the clause simplifying section 140, one or more optimal assignments of values determined by the assignment determining section 150, and/or one or more sums produced by the weight summing section 160.

The output section 170 may output any of the various outputs to an external storage or to a computer or server through a network such as the Internet, WAN, and/or LAN. The outputting may include storing, uploading to a server, printing, displaying on a screen, or otherwise making the various outputs available for viewing or analysis. The output section 170 may output any of the various outputs through any output device or combination of output devices. For example, the output section 170 may be configured to provide still or moving visual output, audio output, or vibration or other touch-based output via a screen, speaker, printer, or other output device. The output section 170 may provide the various outputs to a remote user terminal or a remote user device.

The apparatus 100 shown in FIG. 1 can obtain a set of clauses representing a MAX-SAT instance and apply one or more inference rules. In addition to known inference rules, the apparatus 100 can further simplify a MAX-SAT instance by the application of the following Inference Rules 1 and 2, shown informally in Table 1 below. Formal definitions and proofs of Inference Rules 1 and 2 can be found under the headings "Lemma 8 (Degree-2 Not-Equal Soft Clause Rule)" and "Lemma 10 (Degree-2 Hard Binary Clause Rule)," respectively, described in detail below.

TABLE 1

| Rule | Given Conditions | Resulting Inference |
|---|---|---|
| 1 | (i) no clauses in the MAX-SAT instance other than a first clause (a ∨ b, $w_{11}$), a second clause ($\bar{a} \vee \bar{b}$, $w_{12}$), a third clause (a ∨ c, $w_{21}$), a fourth clause ($\bar{a} \vee \bar{c}$, $w_{22}$), and a fifth clause (a, $w_0$) contain a literal of a and a non-zero weight; and<br>(ii) $\min(w_{11},w_{12}) \geq w_0 + \max(w_{21},w_{22})$ | a ≠ b |
| 2 | (i) the MAX-SATinstance includes a first clause (a ∨ b, H) and a second clause (a ∨ c, H);<br>(ii) no hard clauses in the plurality of clauses other than the first and second clauses contain the literal a; and<br>(iii) $w_{unit}(\bar{a}) + w_{unit}(b) \geq X_b$ and $w_{unit}(\bar{a}) + w_{unit}(c) \geq X_c$, where $w_{unit}(\bar{a})$ is the weight $w_1$ of a clause ($\bar{a}$, $w_1$) included in the plurality of clauses, $w_{unit}(b)$ is the weight $w_2$ of a clause (b, $w_2$) included in the plurality of clauses, $w_{unit}(c)$ is the weight $w_3$ of a clause (c, $w_3$) included in the plurality of clauses, $X_b$ is the sum of the weights of all clauses in the plurality of clauses, other than hard clauses containing the literal a, that contain at least one of the literals a and $\bar{b}$, and $X_c$ is the sum of the weights of all clauses in the plurality of clauses, other than hard clauses containing the literal a, that contain at least one of the literals a and $\bar{c}$ | b = c |

Thus, according to Inference Rule 1, if conditions (i) and (ii) shown in the corresponding row of Table 1 are satisfied, the resulting inference that a≠b can be made. In other words, the clauses of the MAX-SAT instance can be simplified under the assumption that a≠b. Similarly, according to Inference Rule 2, if conditions (i), (ii), and (iii) shown in the corresponding row of Table 1 are satisfied, the resulting inference that b=c can be made. In other words, the clauses of the MAX-SAT instance can be simplified under the assumption that b=c.

By simplifying a MAX-SAT instance in accordance with one or both of Inference Rules 1 and 2, the apparatus 100 can decrease the time and resources necessary to find a solution. Thus, when applied in a practical setting in any number of technical fields that use MAX-SAT, the apparatus 100 can be used to produce practical results associated with such fields, e.g. test results, technical designs, actual products, etc., more quickly and efficiently. Moreover, considering the decreased time and resources necessary to find a solution to a MAX-SAT instance even in the abstract, the apparatus 100 represents an improvement to existing MAX-SAT solvers. That is, when implemented as a MAX-SAT solver (applicable to a wide range of technical fields), the apparatus 100 consumes less time and resources than existing MAX-SAT solvers.

Figure 2:
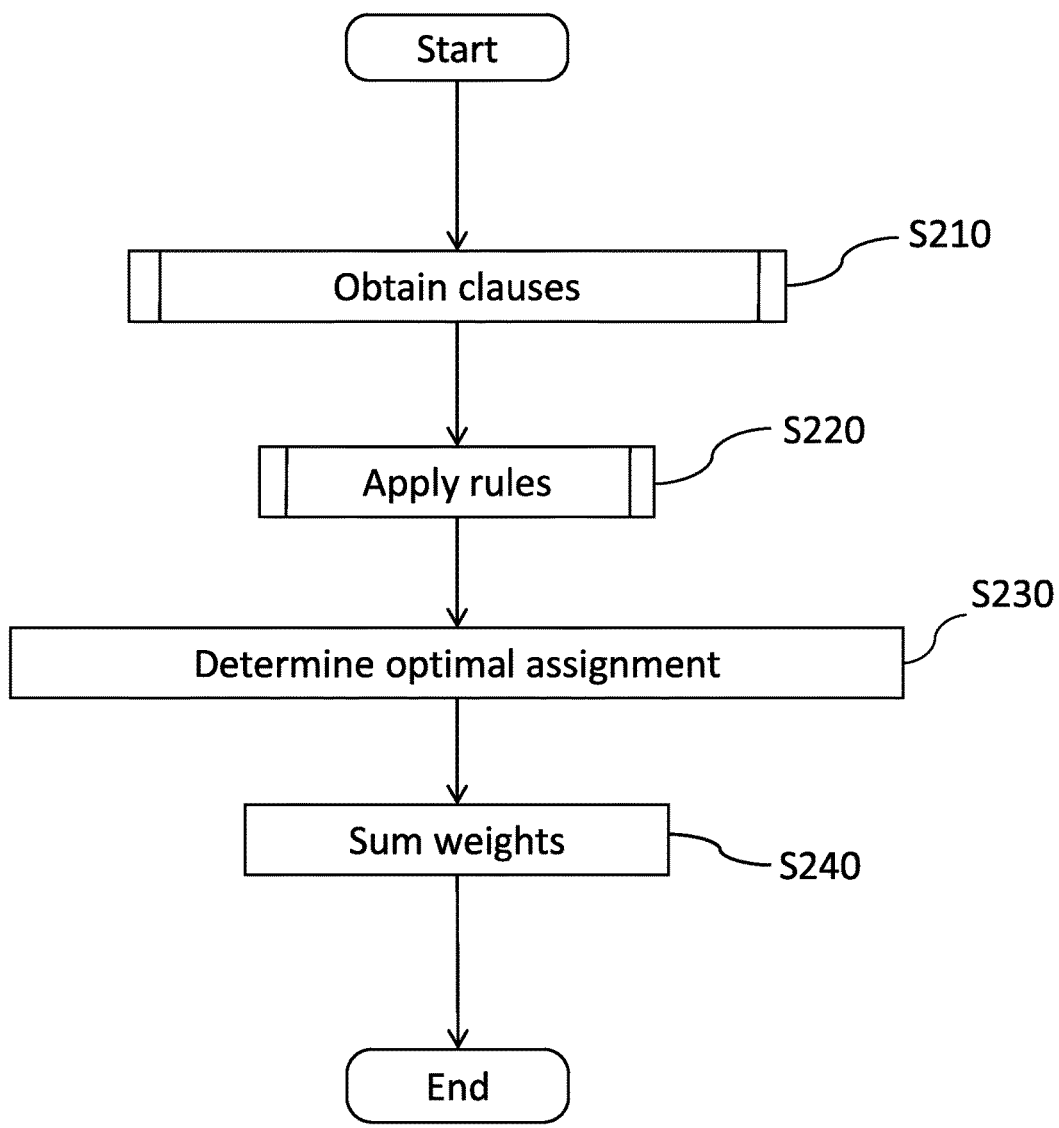
FIG. 2 shows an example operational flow of the apparatus 100 according to an embodiment of the present invention.

FIG. 2 shows an example operational flow of the apparatus 100 according to an embodiment of the present invention. In the example shown in FIG. 2, the apparatus 100 performs the operations from S210 to S240, but the apparatus 100 shown in FIG. 1 is not limited to using this operational flow. Also, the operational flow in FIG. 2 may be performed by a modified apparatus or a different apparatus that differs from the apparatus 100 shown in FIG. 1.

First, the apparatus 100 obtains a plurality of clauses associated with a plurality of logical variables, each of the clauses consisting of a weight and a disjunction of one or more literals of the logical variables (S210). For example, the input section 110 of the apparatus 100 may obtain the plurality of clauses by receiving the plurality of clauses from outside the apparatus, or the clause generating section 111 of the input section 110 may generate the plurality of clauses based on a graph and the input section 110 may obtain the generated plurality of clauses. The input section 110 may store the obtained plurality of clauses in the clause storage 120.

Next, the apparatus 100 applies one or more inference rules to the plurality of clauses (S220). For example, the detecting section 130 of the apparatus 100 may detect whether conditions of one or more inference rules are met by the plurality of clauses stored in the clause storage 120, and the clause simplifying section 140 of the apparatus 100 may simplify the plurality of clauses stored in the clause storage 120 on the basis of the detection. In this way, the apparatus 100 may apply Inference Rule 1 and/or Inference Rule 2.

Next, the apparatus 100 determines, based on the simplified plurality of clauses, an optimal assignment of values to the plurality of logical variables, the optimal assignment of values determined so as to maximize the sum of the weights of clauses satisfied by the assignment (S230). For example, the assignment determining section 150 of the apparatus 100 may determine the optimal assignment by known methods.

Lastly, the apparatus 100 sums the weights of the clauses satisfied or not satisfied by the optimal assignment of values (S240). For example, the weight summing section 160 of the apparatus 100 may sum the weights of the satisfied clauses so that the resulting sum represents the benefit of the assignment or may sum the weights of the unsatisfied clauses so that the resulting sum represents the cost of the assignment.

In the example operational flow shown in FIG. 2, step S240 follows step S230. However, step S240 may instead precede step S230, for example, if the sum of weights produced by the weight summing section 160 is used by the assignment determining section 150 to determine the optimal assignment of values. Or, steps S230 and S240 may occur simultaneously or may overlap, depending on the method used to determine the optimal assignment of values.

Figure 3:
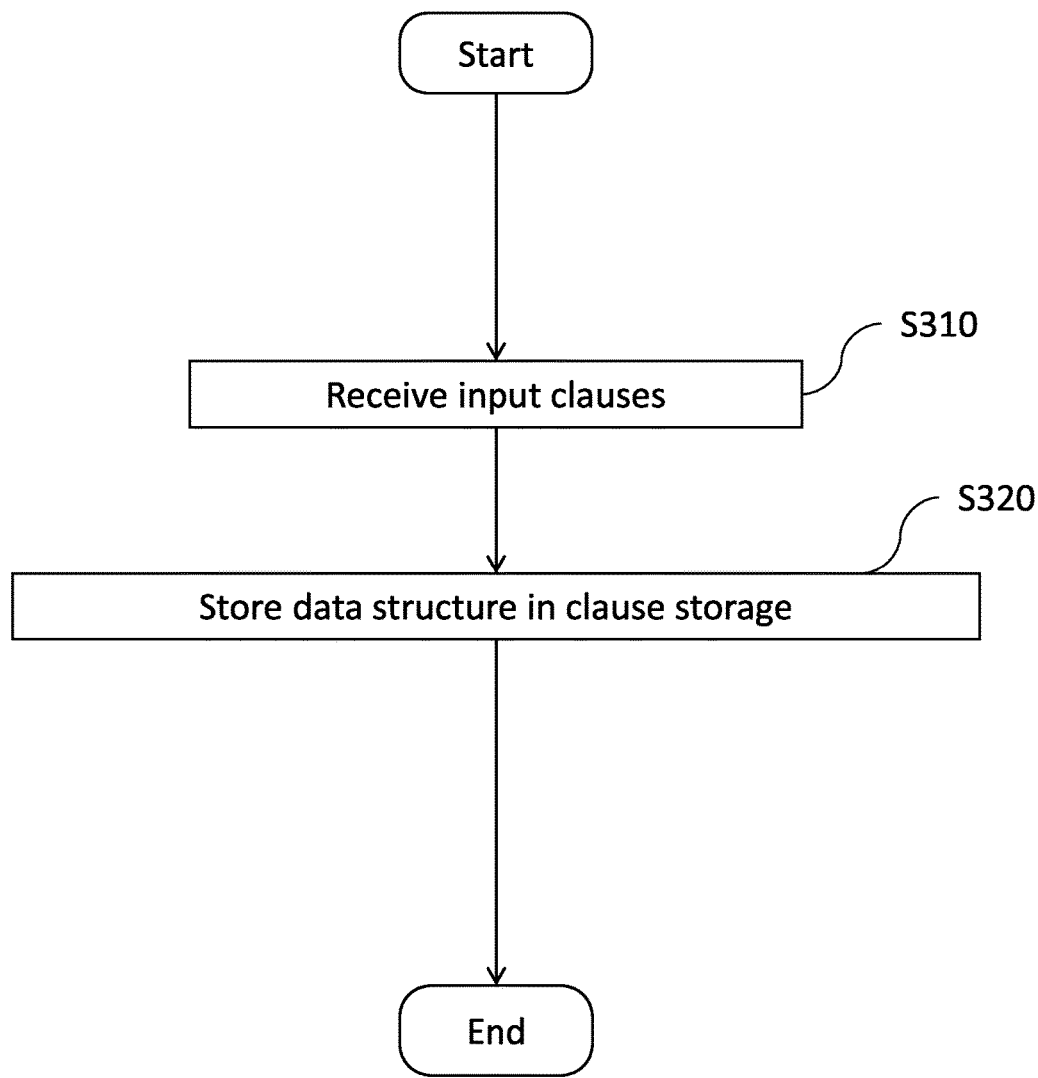
FIG. 3 shows an example operational flow of step S210 in FIG. 2.

FIG. 3 shows an example operational flow of step S210 in FIG. 2. First, the input section 110 of the apparatus 100 may obtain a plurality of clauses by receiving input clauses from outside the apparatus (S310). Then, the input section 110 may store the obtained plurality of clauses in the clause storage 120 (S320). For example, the input section 110 may produce or modify a data structure containing information of the plurality of clauses and store the data structure in the clause storage 120. The data structure stored in the clause storage 120 may include, for each of the logical variables, a list of the clauses that contain a literal of the logical variable and a non-zero weight.

Figure 4:
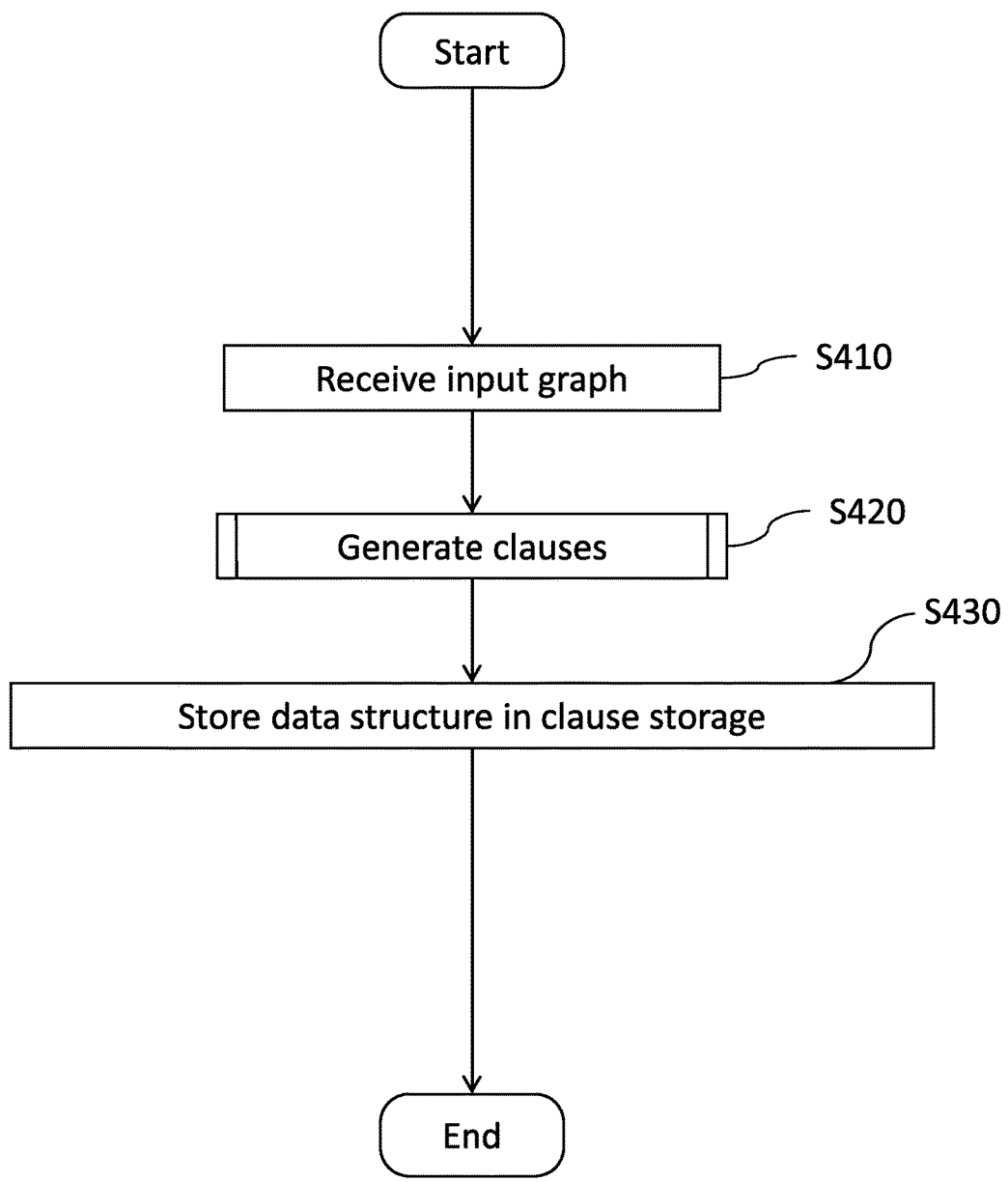
FIG. 4 shows an alternative example operational flow of step S210 in FIG. 2.

FIG. 4 shows an alternative example operational flow of step S210 in FIG. 2. First, the input section 110 of the apparatus 100 may receive an input graph from outside the apparatus (S410). Then, the clause generating section 111 may generate a plurality of clauses based on the graph (S420). Then, the input section 110 may store the plurality of clauses thus obtained in the clause storage 120 (S430). For example, the input section 110 may produce a data structure containing information of the plurality of clauses and store the data structure in the clause storage 120. The data structure stored in the clause storage 120 may include, for each of the logical variables, a list of the clauses that contain a literal of the logical variable and a non-zero weight.

Figure 5:
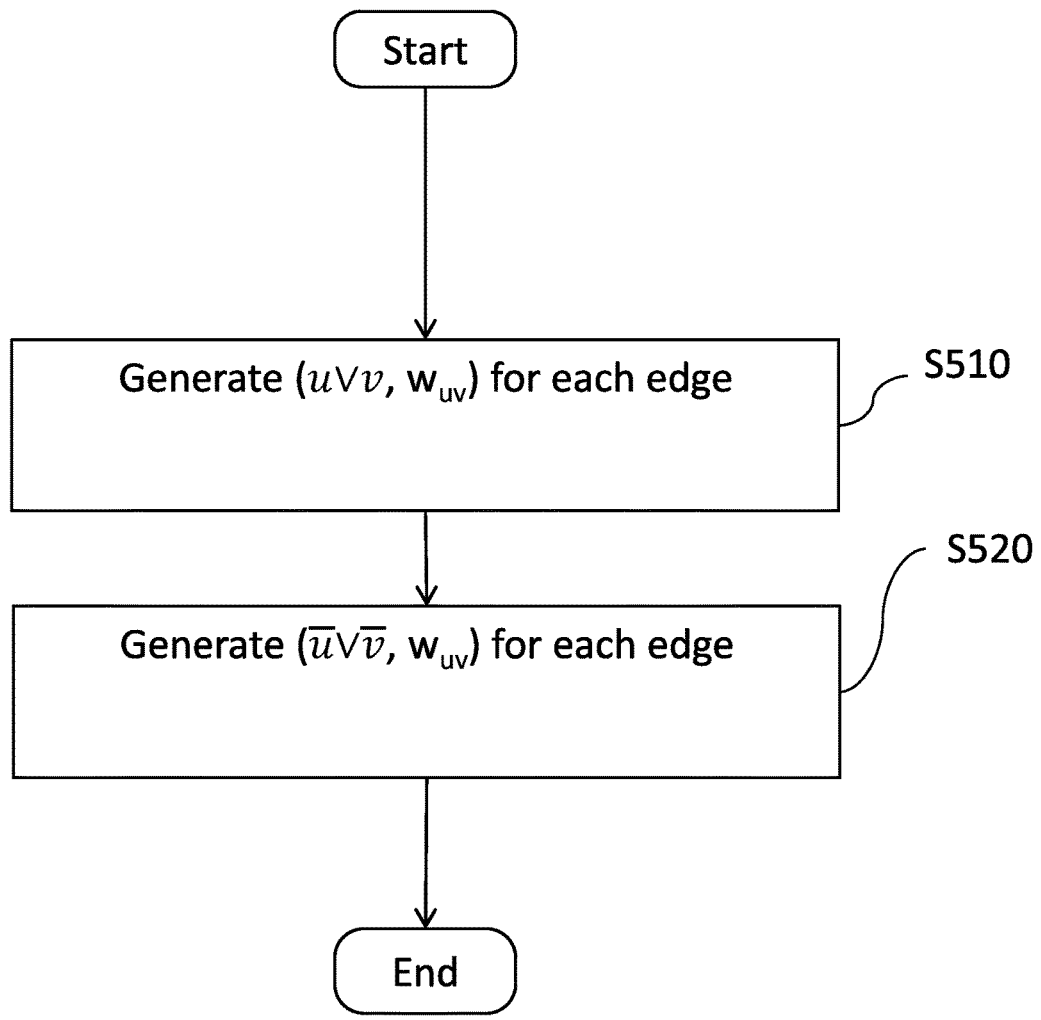
FIG. 5 shows an example operational flow of step S420 in FIG. 4.

FIG. 5 shows an example operational flow of step S420 in FIG. 4. The example of FIG. 5 relates to an application of Inference Rule 1, namely solving a maximum cut problem of a graph. Given a graph having a plurality of vertices and a plurality of weighted edges connecting the vertices, the maximum cut problem is to find a subset of vertices among the plurality of vertices (maximum cut subset) such that a sum of the weights of the edges connecting vertices in the subset with vertices not in the subset is maximized.

After the input section 110 of the apparatus 100 has received an input graph in step S410, in step S420 the clause generating section 111 may generate, based on the graph, a plurality of clauses associated with the graph such that each vertex of the plurality of vertices is represented by a logical variable and the plurality of clauses includes two clauses $(u \lor v, w_{uv})$ and $(\bar{u} \lor \bar{v}, w_{uv})$ for each edge of the plurality of weighted edges, where u and v are logical variables representing the vertices connected by the edge and $w_{uv}$ is the weight associated with the edge. That is, the clause generating section 111 may generate $(u \lor v, w_{uv})$ and $(\bar{u} \lor \bar{v}, w_{uv})$ for each edge (S510, S520). In the example operational flow of FIG. 5, step S520 follows step S510. However, step S520 may instead precede step S510 or steps S510 and S520 may occur simultaneously or overlap.

FIG. 6 shows an example graph, along with a corresponding example representation of a data structure. In the upper portion of FIG. 6, the graph is shown, in which it can be seen that the graph includes five vertices a, b, c, d, and e (represented as points) and seven edges (represented as line segments) connecting the vertices. In the lower portion of FIG. 6, there is a representation of a data structure corresponding to the graph. The graph may be, for example, an input graph received by the input section 110 of the apparatus 100 in step S410 of FIG. 4, and the data structure may be, for example, the data structure stored by the input section 110 in the clause storage 120 in step S430 of FIG. 4.

The data structure shown in FIG. 6 includes, for each of the logical variables, a list of the clauses that contain a literal of the logical variable and a non-zero weight. With the clause generating section 111 having generated $(u \lor v, w_{uv})$ and $(\bar{u} \lor \bar{v}, w_{uv})$ for each edge, the plurality of clauses associated with the graph shown in FIG. 6 includes $(a \lor b, w_{ab})$, $(\bar{a} \lor \bar{b}, w_{ab})$, $(a \lor c, w_{ac})$, $(\bar{a} \lor \bar{c}, w_{ac})$, $(a \lor e, w_{ae})$, $(\bar{a} \lor \bar{e}, w_{ae})$, $(b \lor c, w_{bc})$, $(\bar{b} \lor \bar{c}, w_{bc})$, $(b \lor e, w_{be})$, $(\bar{b} \lor \bar{e}, w_{be})$, $(c \lor d, w_{cd})$, $(\bar{c} \lor \bar{d})$, $(d \lor e, w_{de})$, and $(\bar{d} \lor \bar{e}, w_{de})$. Of these, $(a \lor b, w_{ab})$, $(\bar{a} \lor \bar{b}, w_{ab})$, $(a \lor c, w_{ac})$, $(\bar{a} \lor \bar{c}, w_{ac})$, $(a \lor e, w_{ae})$, and $(\bar{a} \lor \bar{e}, w_{ae})$ contain a literal of the logical variable a. Therefore, the data structure shown in FIG. 6 includes the list $(a \lor b, w_{ab})$, $(\bar{a} \lor \bar{b}, w_{ab})$, $(a \lor c, w_{ac})$, $(\bar{a} \lor \bar{c}, w_{ac})$, $(a \lor e, w_{ae})$, and $(\bar{a} \lor \bar{e}, w_{ae})$ for the logical variable a. As shown in FIG. 6, the list $(a \lor b, w_{ab})$, $(\bar{a} \lor \bar{b}, w_{ab})$, $(a \lor c, w_{ac})$, $(\bar{a} \lor \bar{c}, w_{ac})$, $(a \lor e, w_{ae})$, and $(\bar{a} \lor \bar{e}, w_{ae})$ is stored in association with the logical variable a. Other lists are similarly stored for each of the logical variables b, c, d, and e. As mentioned above, a clause with weight w=0 is considered equivalent to the non-existence of the clause, while the data structure stores only clauses having non-zero weight. Thus, although other clauses can be said to exist in the set of clauses, they do not appear in the data structure. Since each of the edges is represented in the data structure, it can be assumed that each of the weights $w_{ab}$, $w_{ac}$, $w_{ae}$, $w_{bc}$, $w_{be}$, $w_{cd}$, and $w_{de}$ is non-zero.

The plurality of clauses generated for the graph as explained above can be used to solve the maximum cut problem. That is, if the value of each of the logical variables indicates whether the vertex represented by that logical variable is in the subset or not in the subset (e.g. TRUE=in the subset, FALSE=not in the subset), then a solution to the MAX-SAT instance consisting of the clauses generated for the graph yields a solution to the maximum cut problem. This is because each pair of clauses $(u \lor v, w_{uv})$ and $(\bar{u} \lor \bar{v}, w_{uv})$ associated with an edge contributes weight only when one of the two vertices of the edge is in the subset and the other is not, i.e. when the edge is "cut." Therefore, when the assignment determining section 150 determines an optimal assignment of values to a plurality of logical variables associated with clauses that are associated with a graph, the determination of the optimal assignment may include determining a solution to the maximum cut problem of the graph, where the value of each of the logical variables in the determined optimal assignment indicates whether the vertex represented by the logical variable is in the maximum cut subset or not in the maximum cut subset.

By applying Inference Rule 1 to the MAX-SAT instance generated for the maximum cut problem as explained above with respect to FIG. 6, the MAX-SAT instance, and consequently the maximum cut problem, can be simplified. Therefore, the apparatus 100 can be used to more quickly and efficiently produce practical results in technical fields where the maximum cut problem is applied.

Figure 7:
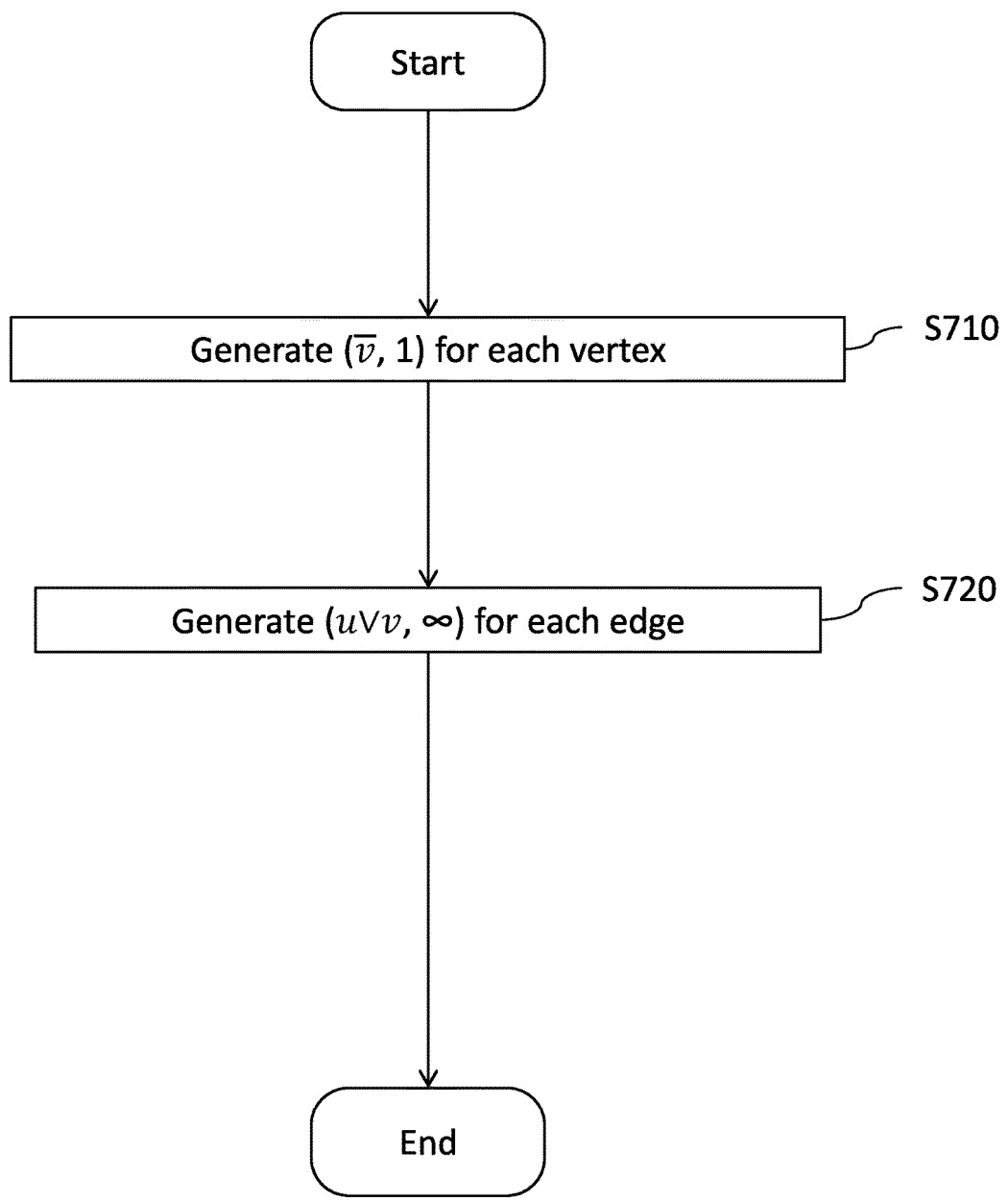
FIG. 7 shows an alternative example operational flow of step S420 in FIG. 4.

FIG. 7 shows an alternative example operational flow of step S420 in FIG. 4. The example of FIG. 7 relates to an application of Inference Rule 2, namely solving a minimum vertex cover problem of a graph. Given a graph having a plurality of vertices and a plurality of edges connecting the vertices, the minimum vertex cover problem is to find a set of vertices with minimum size among the plurality of vertices (minimum vertex cover set) such that, for each of the plurality of edges, the set of vertices includes at least one of the two vertices connected by the edge.

After the input section 110 of the apparatus 100 has received an input graph in step S410, in step S420 the clause generating section 111 may generate, based on the graph, a plurality of clauses associated with the graph such that each vertex of the plurality of vertices is represented by a logical variable and the plurality of clauses includes a clause $(\bar{v}, 1)$ for each vertex of the plurality of vertices and a clause $(u \lor v, H)$ for each edge of the plurality of edges, where u and v are logical variables representing the vertices connected by the edge. That is, the clause generating section 111 may generate $(\bar{v}, 1)$ for each vertex (S710) and $(u \lor v, H)$ for each edge (S720). In the example operational flow of FIG. 7, step S720 follows step S710. However, step S720 may instead precede step S710 or steps S710 and S720 may occur simultaneously or overlap.

Figure 8:
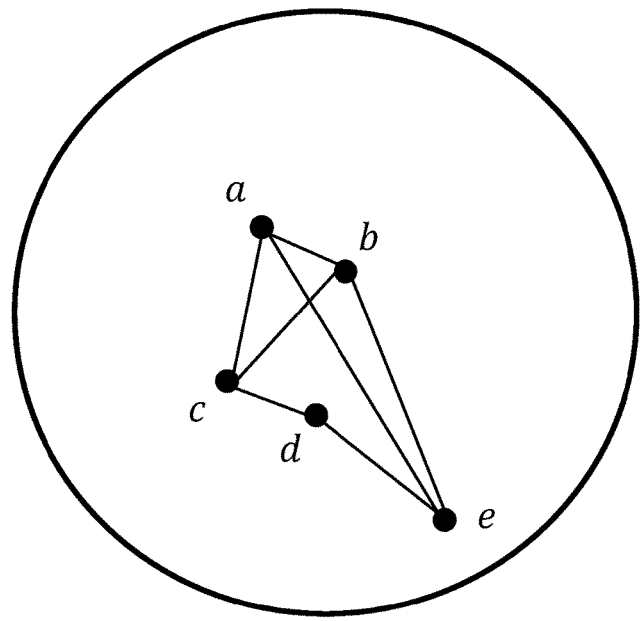
FIG. 8 shows an example graph, along with a corresponding example representation of a data structure.

FIG. 8 shows an example graph, along with a corresponding example representation of a data structure. In the upper portion of FIG. 8, the graph is shown, in which it can be seen that the graph includes five vertices a, b, c, d, and e (represented as points) and seven edges (represented as line segments) connecting the vertices. In the lower portion of FIG. 8 is a representation of a data structure corresponding to the graph. The graph may be, for example, an input graph received by the input section 110 of the apparatus 100 in step S410 of FIG. 4, and the data structure may be, for example, the data structure stored by the input section 110 in the clause storage 120 in step S430 of FIG. 4.

The data structure shown in FIG. 8 includes, for each of the logical variables, a list of the clauses that contain a literal of the logical variable and a non-zero weight. With the clause generating section 111 having generated $(\bar{v}, 1)$ for each vertex and $(u \lor v, H)$ for each edge, the plurality of clauses associated with the graph shown in FIG. 8 includes $(\bar{a}, 1)$, $(\bar{b}, 1)$, $(\bar{c}, 1)$, $(\bar{d}, 1)$, $(\bar{e}, 1)$, $(a \lor b, H)$, $(a \lor c, H)$, $(a \lor e, H)$, $(b \lor c, H)$, $(b \lor e, H)$, $(c \lor d, H)$, and $(d \lor e, H)$. Of these, $(\bar{a}, 1)$, $(a \lor b, H)$, $(a \lor c, H)$, and $(a \lor e, H)$ contain a literal of the logical variable a. Therefore, the data structure shown in FIG. 8 includes the list $(\bar{a}, 1)$, $(a \lor b, H)$, $(a \lor c, H)$, and $(a \lor e, H)$ for the logical variable a. As shown in FIG. 8, the list $(\bar{a}, 1)$, $(a \lor b, H)$, $(a \lor c, H)$, and $(a \lor e, H)$ is stored in association with the logical variable a. Other lists are similarly stored for each of the logical variables b, c, d, and e. As mentioned above, a clause with weight w=0 is considered equivalent to the non-existence of the clause, while the data structure stores only clauses having non-zero weight. Thus, although other clauses can be said to exist in the set of clauses, they do not appear in the data structure.

The plurality of clauses generated for the graph as explained above can be used to solve the minimum vertex cover problem. That is, if the value of each of the logical variables indicates whether the vertex represented by that logical variable is in the set or not in the set (e.g. TRUE=in the set, FALSE=not in the set), then a solution to the MAX-SAT instance consisting of the clauses generated for the graph yields a solution to the minimum vertex cover problem. This is because each clause $(\bar{v}, 1)$ associated with a vertex contributes weight only when the vertex is not in the subset, such that maximizing the weight minimizes the number of vertices in the set, while the hard clauses $(u \lor v, H)$ guarantee that at least one of the two vertices connected by each edge is included in the set. Therefore, when the assignment determining section 150 determines an optimal assignment of values to a plurality of logical variables associated with clauses that are associated with a graph, the determination of the optimal assignment may include determining a solution to the minimum vertex problem of the graph, where the value of each of the logical variables in the determined optimal assignment indicates whether the vertex represented by the logical variable is in the minimum vertex cover set or not in the minimum vertex cover set.

By applying Inference Rule 2 to the MAX-SAT instance generated for the minimum vertex problem as explained above with respect to FIG. 8, the MAX-SAT instance, and consequently the minimum vertex cover problem, can be simplified. Therefore, the apparatus 100 can be used to more quickly and efficiently produce practical results in technical fields where the minimum vertex cover problem is applied.

Figure 9:
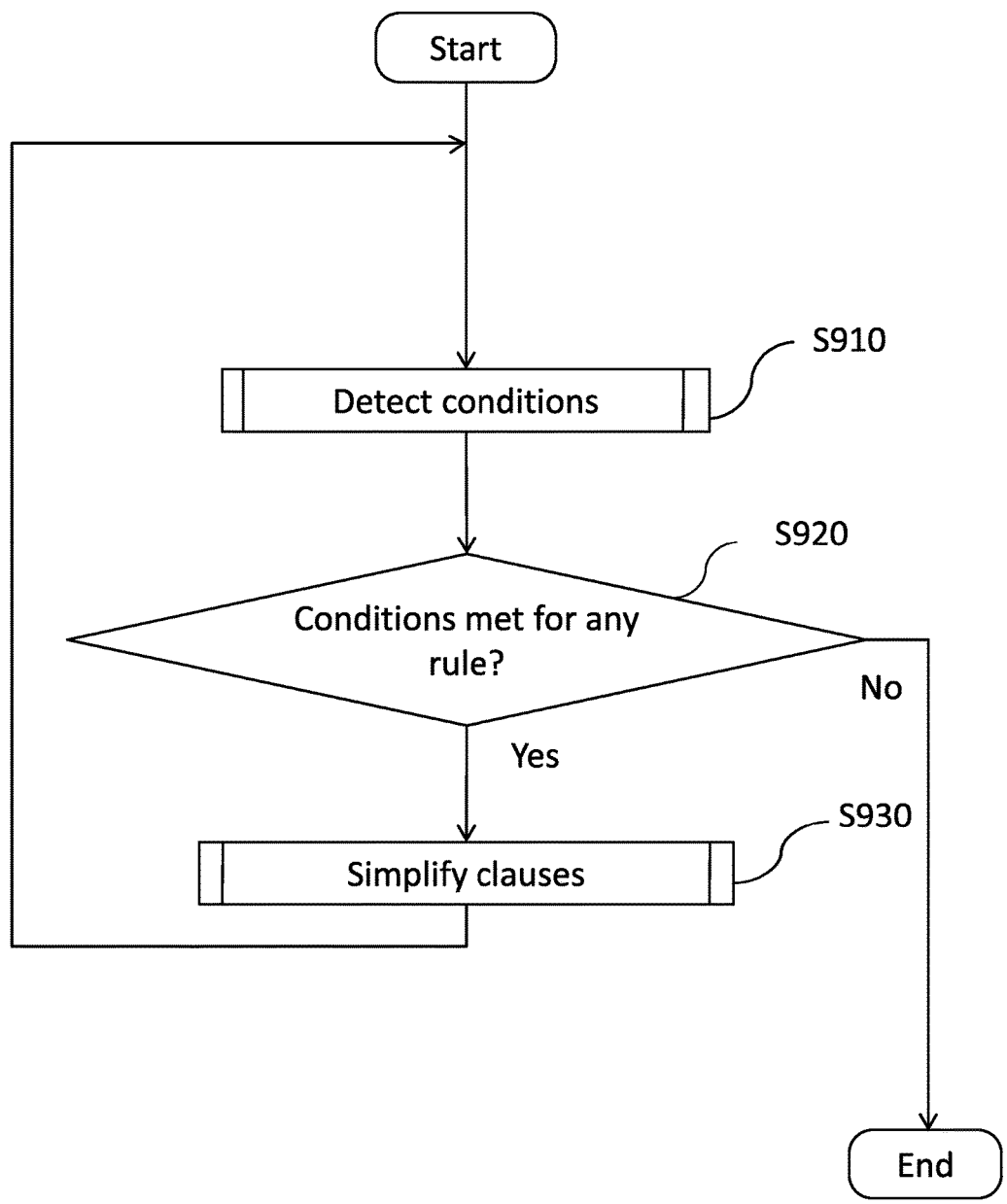
FIG. 9 shows an example operational flow of step S220 in FIG. 2.

FIG. 9 shows an example operational flow of step S220 in FIG. 2. After the input section 110 of the apparatus 100 has obtained the plurality of clauses in step S210, e.g., by receiving the plurality of clauses from outside the apparatus in accordance with FIG. 3 or by generating the plurality of clauses based on a graph in accordance with FIG. 4, the apparatus detects one or more conditions in accordance with one or more inference rules (S910). For example, the detecting section 130 of the apparatus 100 may detect whether the plurality of clauses stored in the clause storage 120 meet condition(s) including those of Inference Rule 1 and/or Inference Rule 2. If the conditions of any rule (e.g. any rule set to be applied by the apparatus 100) are met ("Yes" at S920), the apparatus 100 simplifies the clauses in accordance with the rule (S930). For example, the clause simplifying section 140 of the apparatus 100 may simplify the plurality of clauses stored in the clause storage 120 in accordance with the rule and store the simplified plurality of clauses in the clause storage 120 in place of or in addition to the previous version. The operational flow then returns to step S910, where the detecting section 130 may again detect condition(s), this time on the basis of the simplified plurality of clauses stored in the clause storage 120. Thus, the detecting by the detecting section 130 may be repeated after the simplification by the clause simplifying section 140 one or more times. If, at any time, the conditions are not met for any rule ("No" at S920), the operational flow ends.

Figure 10:
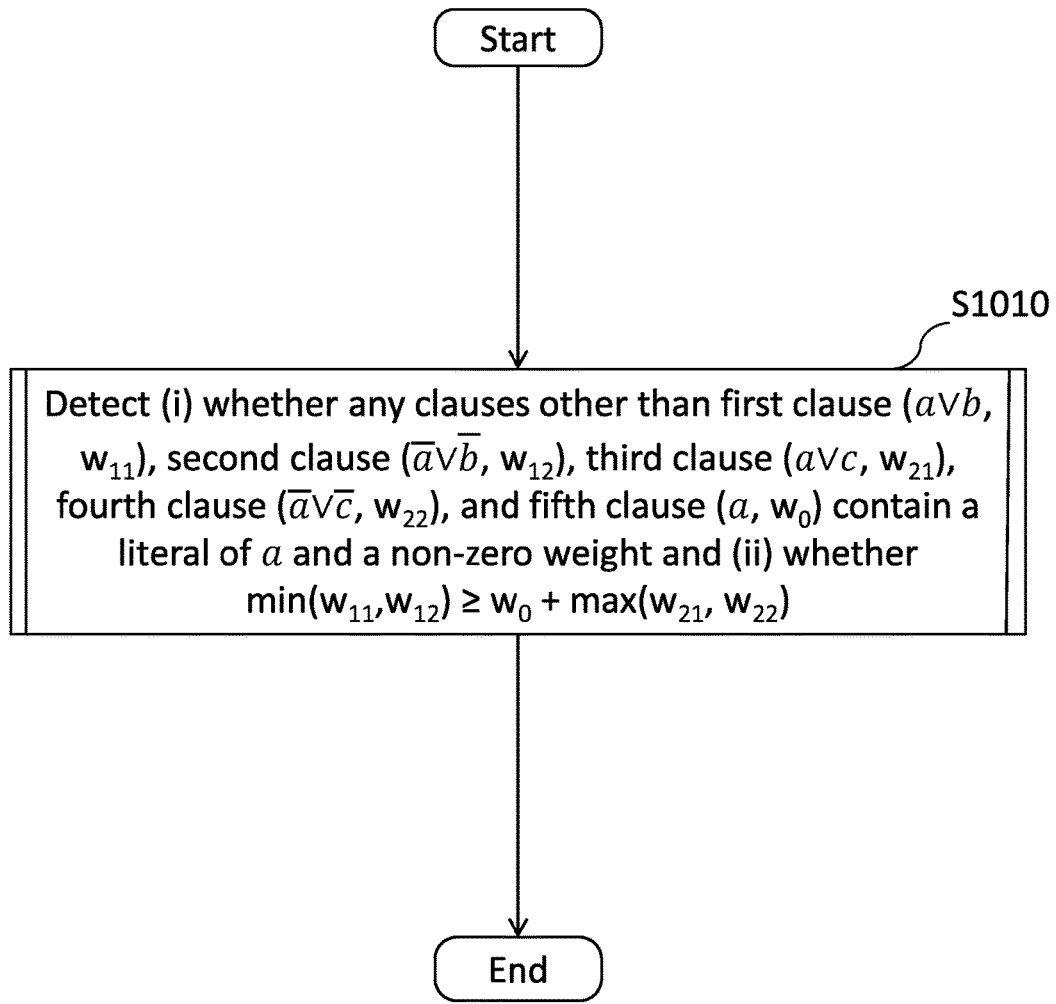
FIG. 10 shows an example operational flow of step S910 in FIG. 9.

FIG. 10 shows an example operational flow of step S910 in FIG. 9. In the example of FIG. 10, the conditions of Inference Rule 1 are detected with respect to the logical variable a (i.e. with a as the "first logical variable"). Namely, the detecting section 130 detects (i) whether any clauses in the plurality of clauses other than a first clause (a$\vee$b, $w_{11}$), a second clause ($\bar{a}\vee\bar{b}$, $w_{12}$), a third clause (a$\vee$c, $w_{21}$), a fourth clause ($\bar{a}\vee\bar{c}$, $w_{22}$), and a fifth clause (a, $w_0$), where a is a first logical variable, b is a second logical variable, c is a third logical variable, and $w_{11}$, $w_{12}$, $w_{21}$, and $w_{22}$ are weights, contain a literal of the first logical variable a and a non-zero weight and (ii) whether $\min(w_{11}, w_{12}) \geq w_0 + \max(w_{21}, w_{22})$ (S1010). The detecting section 130 may detect conditions (i) and (ii) of Inference Rule 1 simultaneously or sequentially in any order, may detect preliminary conditions that obviate the need to check one or both of conditions (i) and (ii), and/or may detect other, different conditions that are not identical to conditions (i) and (ii) but substantially satisfy conditions (i) and (ii). An example of such a condition that substantially satisfies condition (ii) may be a numerically similar inequality such as $\min(w_{11}, w_{12}) \geq w_0 + \max(w_{21}, w_{22}) + 1$. Assuming that satisfaction of this inequality substantially satisfies condition (ii) for the set of clauses in question, detecting such similar inequality in place of condition (ii) is included in the meaning of detecting condition (ii). That is, as used herein, detecting a condition includes detecting a non-identical condition that substantially satisfies the condition.

Figure 11:
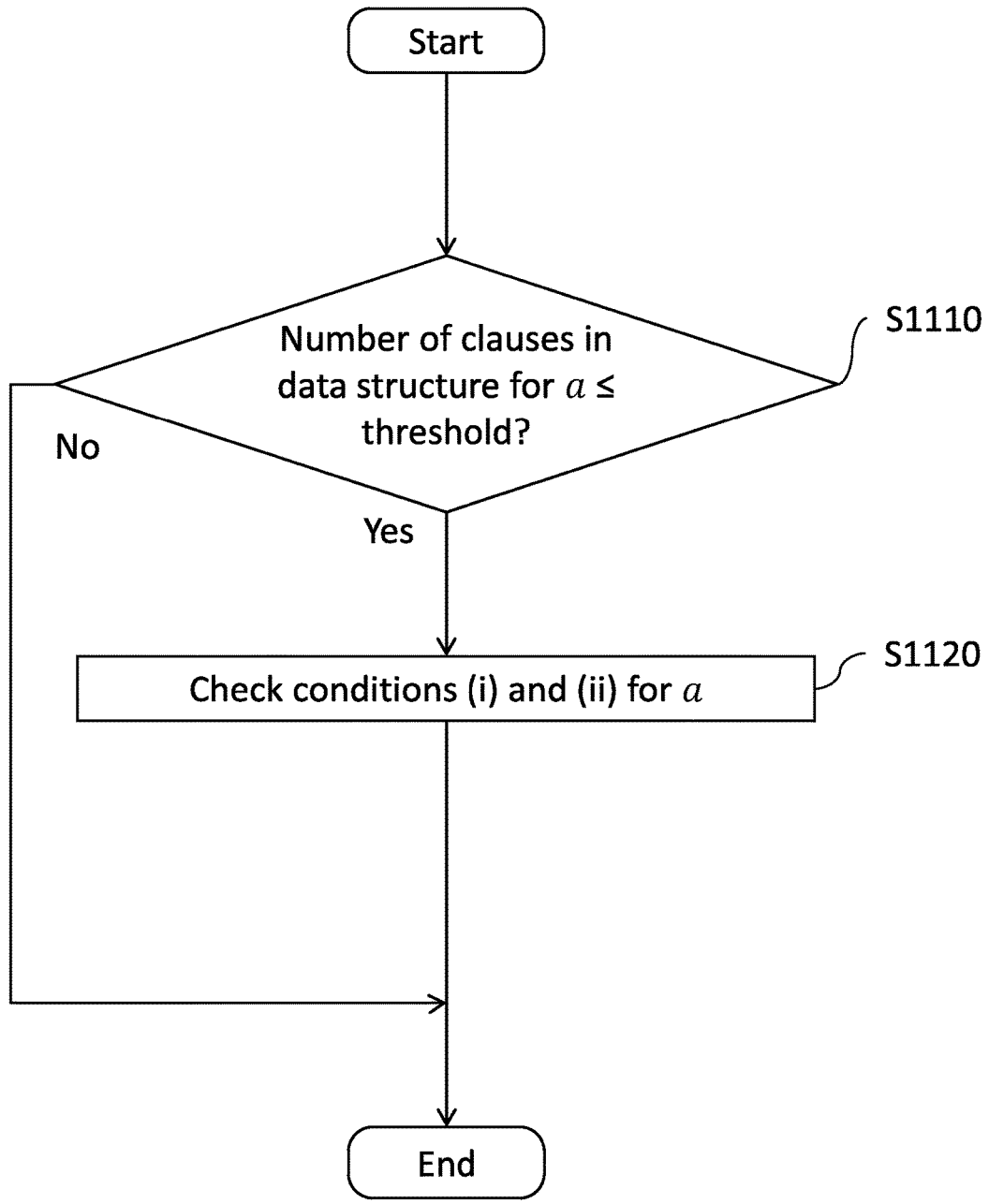
FIG. 11 shows an example operational flow of step S1010 in FIG. 10.

FIG. 11 shows an example operational flow of step S1010 in FIG. 10. FIG. 11 is an example of detecting preliminary conditions that obviate the need to check one or both of conditions (i) and (ii). An inspection of the conditions of Inference Rule 1 reveals that condition (i) cannot be satisfied with respect to the logical variable a if there are too many clauses containing a literal of a and a non-zero weight. That is, there can be at most five, since any more would mean that there exists some clause other than the first through fifth clauses that contains a literal of a and a non-zero weight. Thus, the detecting in step S1010 may include confirming that the number of clauses in the list of clauses for the first logical variable a is not more than a threshold before detecting one or more of (i) whether any clauses in the plurality of clauses other than the first, second, third, fourth, and fifth clauses contain a literal of the first logical variable a and a non-zero weight and (ii) whether $\min(w_{11}, w_{12}) \geq w_0 + \max(w_{21}, w_{22})$. As shown in FIG. 11, when performing step S1010, if the number of clauses in the data structure for a$\leq$a threshold, e.g. 5 ("Yes" at S1110), the detecting section 130 checks conditions (i) and (ii) with respect to a (S1120). Otherwise ("No" at S1110), the operational flow of FIG. 11 ends and the "detecting" step S1010 is considered performed without the need to check conditions (i) and (ii).

In the example of FIG. 11, the preliminary condition represented by step S1110 precedes the checking of conditions (i) and (ii) at step S1120. However, this is only one of many possible variants. For example, the detecting section 130 may check condition (ii) irrespective of the outcome of step S1110, such that a "No" result at step S1110 only obviates the need to check condition (i).

Figure 12:
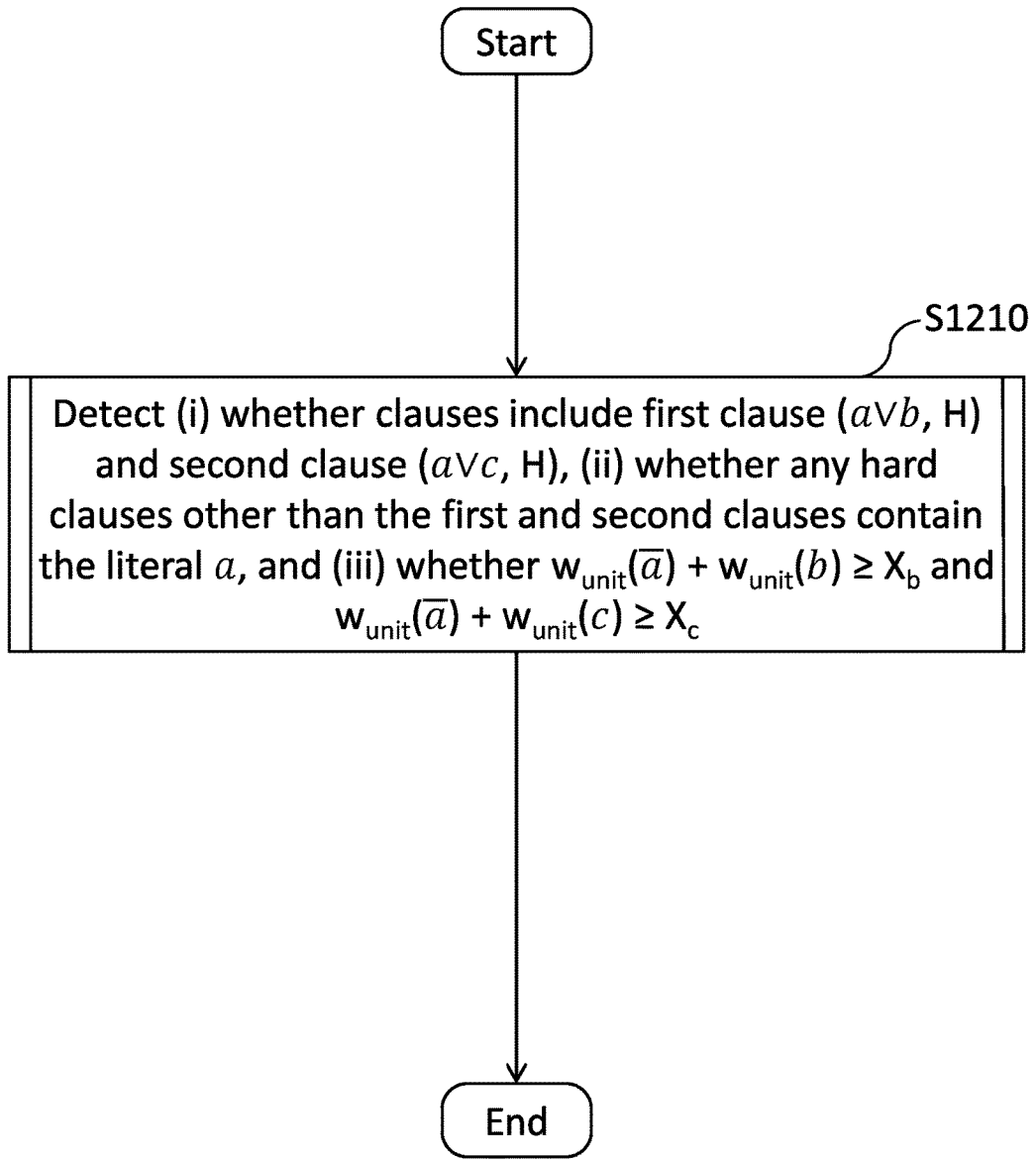
FIG. 12 shows an alternative example operational flow of step S910 in FIG. 9.

FIG. 12 shows an alternative example operational flow of step S910 in FIG. 9. In the example of FIG. 12, the conditions of Inference Rule 2 are detected with respect to the logical variable a (i.e. with a as the "first logical variable"). That is, the detecting section 130 detects (i) whether the plurality of clauses includes a first clause (a$\vee$b, H) and a second clause (a$\vee$c, H), where a is a first logical variable, b is a second logical variable, and c is a third logical variable, (ii) whether any hard clauses in the plurality of clause other than the first and second clauses contain the literal a, and (iii) whether $w_{unit}(\bar{a}) + w_{unit}(b) \geq X_b$ and $w_{unit}(\bar{a}) + w_{unit}(c) \geq X_c$, where $w_{unit}(\bar{a})$ is the weight $w_1$ of a clause ($\bar{a}$, $w_1$) included in the plurality of clauses, $w_{unit}(b)$ is the weight $w_2$ of a clause (b, $w_2$) included in the plurality of clauses, $w_{unit}(c)$ is the weight $w_3$ of a clause (c, $w_3$) included in the plurality of clauses, $X_b$ is the sum of the weights of all clauses in the plurality of clauses, other than hard clauses containing the literal a, that contain at least one of the literals a and $\bar{b}$, and $X_c$ is the sum of the weights of all clauses in the plurality of clauses, other than hard clauses containing the literal a, that contain at least one of the literals a and $\bar{c}$ (S1210). Similarly to when detecting the conditions of Inference Rule 1, the detecting section 130 may detect conditions (i)-(iii) of Inference Rule 2 simultaneously or sequentially in any order, may detect preliminary conditions that obviate the need to check one or more of conditions (i)-(iii), and/or may detect other, different conditions that are not identical to conditions (i)-(iii) but substantially satisfy conditions (i)-(iii).

Figure 13:
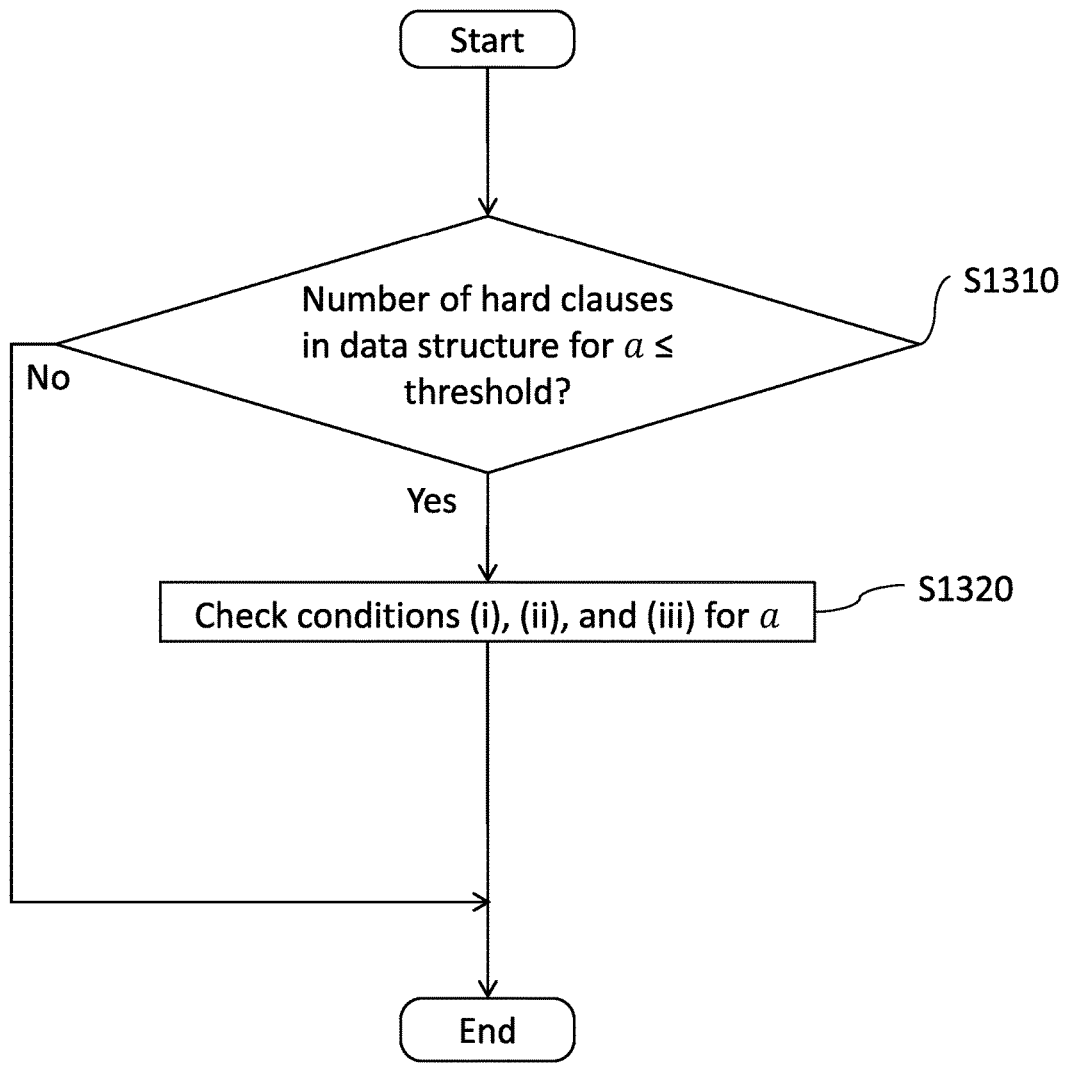
FIG. 13 shows an example operational flow of step S1210 in FIG. 12.

FIG. 13 shows an example operational flow of step S1210 in FIG. 12. FIG. 13 is an example of detecting preliminary conditions that obviate the need to check one or more of conditions (i)-(iii). An inspection of the conditions of Inference Rule 2 reveals that condition (ii) cannot be satisfied with respect to the logical variable a if there are too many hard clauses containing the literal a. That is, there can be at most two, since any more would mean that there exists some hard clause other than the first and second clauses that contains the literal a. Thus, the detecting in step S1210 may include confirming that the number of hard clauses in the list of clauses for the first logical variable a is not more than a threshold before detecting one or more of (i) whether the plurality of clauses includes the first and second clauses, (ii) whether any hard clauses in the plurality of clauses other than the first and second clauses contain the literal a, and (iii) whether $w_{unit}(\bar{a})+w_{unit}(b) \geq X_b$ and $w_{unit}(\bar{a})+w_{unit}(c) \geq X_c$. As shown in FIG. 13, when performing step S1210, if the number of hard clauses in the data structure for $a \leq a$ threshold, e.g. 4 ("Yes" at S1310), the detecting section 130 checks conditions (i)-(iii) with respect to a (S1320). (A threshold of 4 would allow for two hard clauses containing the literal a and two hard clauses containing the literal $\bar{a}$.) Otherwise ("No" at S1310), the operational flow of FIG. 13 ends and the "detecting" step S1210 is considered performed without the need to check conditions (i)-(iii).

In the example of FIG. 13, the preliminary condition represented by step S1310 precedes the checking of conditions (i)-(iii) at step S1320. However, this is only one of many possible variants. For example, the detecting section 130 may check condition (i) irrespective of the outcome of step S1310, such that a "No" result at step S1310 only obviates the need to check conditions (ii) and (iii).

FIGS. 10-13 are only simple examples of sub-flows step S910 in FIG. 9, each illustrating the detection of conditions for only a single instance of an inference rule (e.g. Inference Rule 1 for logical variable "a"; note that an instance of an inference rule is also referred to as a rule herein, such that a plurality of rules may refer to multiple instances of the same rule). As noted above, step S910 may include the detection of conditions for a plurality of rules, including rules other than Inference Rule 1 and Inference Rule 2. In such cases, step 910 may include both the sub-flow of FIG. 10 and the sub-flow of FIG. 12 as well as other sub-flows for other rules. Rules may have overlapping conditions, and such combined sub-flows need not be performed sequentially. Similarly, the sub-flows of FIGS. 11 and 13 (and corresponding sub-flows for other rules) may be combined with many variations, including the detection of preliminary conditions that simultaneously obviate the need to check conditions of multiple rules.

Figure 14:
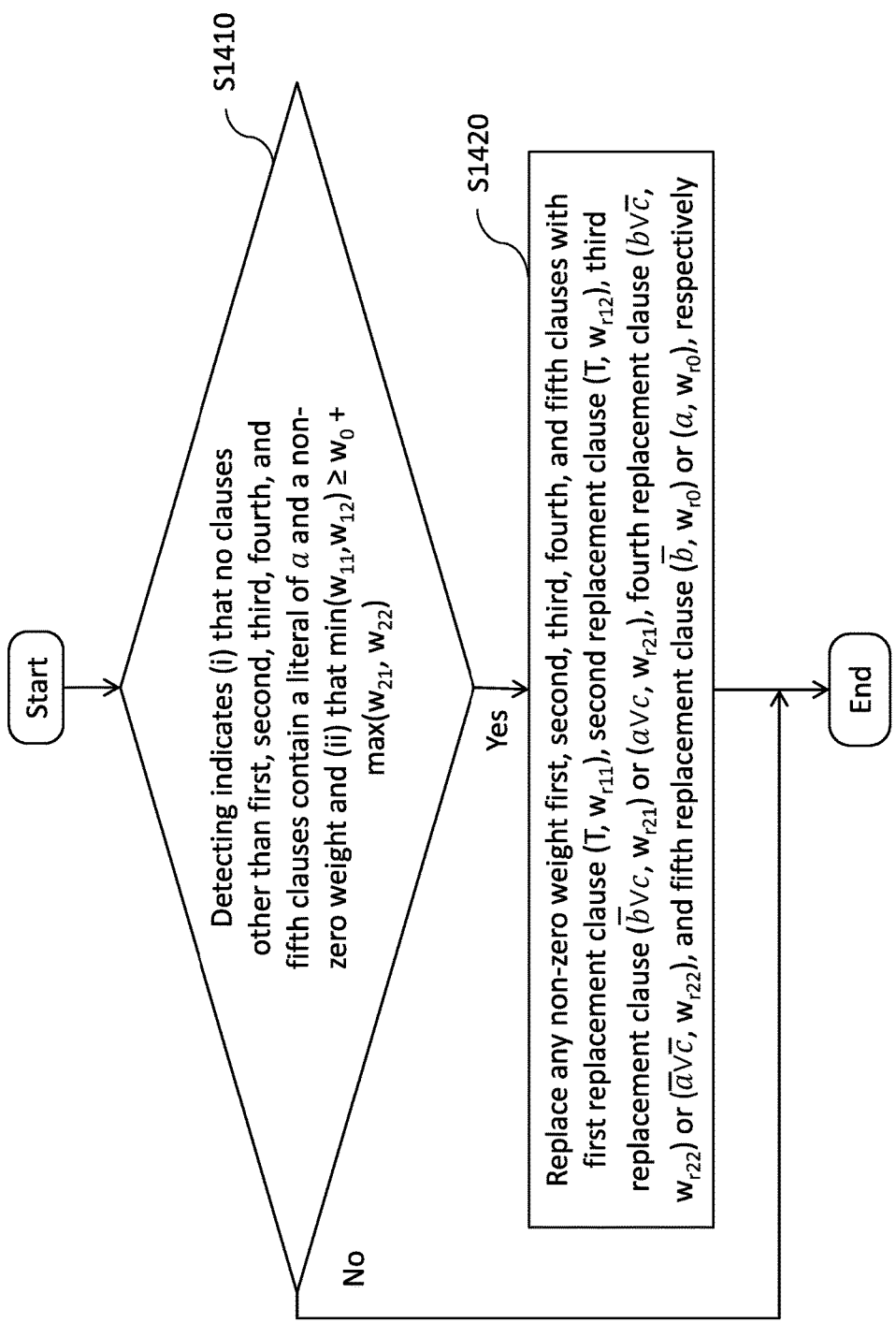
FIG. 14 shows an example operational flow of step S930 in FIG. 9.

FIG. 14 shows an example operational flow of step S930 in FIG. 9. In the example of FIG. 14, it is assumed for simplicity that the apparatus 100 has only performed detection of the conditions of Inference Rule 1 with respect to the logical variable a in step S910. If the conditions of Inference Rule 1 are satisfied, the apparatus 100 simplifies the clauses in accordance with the rule. That is, if the detecting by the detecting section 130 indicates (i) that no clauses in the plurality of clauses other than the first clause $(a \vee b, w_{11})$, the second clause $(\bar{a} \vee \bar{b}, w_{12})$, the third clause $(a \vee c, w_{21})$, the fourth clause $(\bar{a} \vee \bar{c}, w_{22})$, and the fifth clause $(a, w_0)$ contain a literal of the first logical variable a and a non-zero weight and (ii) that $\min(w_{11}, w_{12}) \geq w_0 + \max(w_{21}, w_{22})$ ("Yes" at S1410), the clause simplifying section 140 modifies the plurality of clauses according to the assumption that $a \neq b$. Under the assumption that $a \neq b$, it can be inferred, for example, that $a = \bar{b}$, such that the first clause $(a \vee b, w_{11})$ and the second clause $(\bar{a} \vee \bar{b}, w_{12})$ are automatically satisfied. Thus, the clause simplifying section 140 may replace any clauses having non-zero weight from among the first, second, third, fourth, and fifth clauses with a replacement first clause $(T, w_{r11})$, a replacement second clause $(T, w_{r12})$, a replacement third clause $(\bar{b} \vee c, w_{r21})$ or $(a \vee c, w_{r21})$, a replacement fourth clause $(b \vee \bar{c}, w_{r22})$ or $(\bar{a} \vee \bar{c}, w_{r22})$, and a replacement fifth clause $(\bar{b}, w_{r0})$ or $(a, w_{r0})$, respectively, where $w_{r11}, w_{r12}, w_{r21}, w_{r22}$, and $w_{r0}$ are substantially equal to $w_{11}, w_{12}, w_{21}, w_{22}$, and $w_0$, respectively. Replacing the third, fourth, and fifth clauses with the replacement third clause $(a \vee c, w_{r21})$, the replacement fourth clause $(\bar{a} \vee \bar{c}, w_{r22})$, and the replacement fifth clause $(a, w_{r0})$ may include leaving the third, fourth, and fifth clauses unchanged (S1420). Based on the assumption of $a \neq b$ ($a = \bar{b}$), in step S1420 the clause simplifying section 140 may further replace, in clauses having non-zero weight, every a with $\bar{b}$ or every b with $\bar{a}$ so that one of a and b can be eliminated from the clauses having non-zero weight in the plurality of clauses.

The clause simplifying section 140 may store the simplified plurality of clauses in the clause storage 120 in place of or in addition to the previous version. If the simplified plurality of clauses is simplified on the basis of Inference Rule 1 as explained above, the plurality of clauses may include the first replacement clause $(T, w_{r11})$ and the second replacement clause $(T, w_{r12})$, which have tautologically satisfied disjunctions T and weights substantially equal or equal to $w_{11}$ and $w_{12}$, respectively. Therefore, when the weight summing section 160 refers to the simplified clauses to sum the weights of clauses satisfied or unsatisfied by the optimal assignment of values in step S240 of FIG. 2, the weight summing section 160 may include or not include $w_{11}$ and $w_{12}$ in the resulting sum accordingly. Alternatively, the clause simplifying section 140 may not store clauses having tautologically satisfied disjunctions T and may instead separately provide the weight information of such clauses (e.g. $w_{11}$ and $w_{12}$) to the weight summing section 160. By any of these or other methods, when the weight summing section 160 sums the weights of clauses satisfied by the optimal assignment of values, the resulting sum may include $w_{11}$ and $w_{12}$ if the detecting indicates (i) that no clauses in the plurality of clauses other than the first, second, third, fourth, and fifth clauses contain a literal of the first logical variable a and a non-zero weight and (ii) that $\min(w_{11}, w_{12}) \geq w_0 + \max(w_{21}, w_{22})$ in accordance with Inference Rule 1. Similarly, when the weight summing section 160 sums the weights of clauses not satisfied by the optimal assignment of values, the resulting sum may not include $w_{11}$ or $w_{12}$ if the detecting indicates (i) that no clauses in the plurality of clauses other than the first, second, third, fourth, and fifth clauses contain a literal of the first logical variable a and a non-zero weight and (ii) that $\min(w_{11}, w_{12}) \geq w_0 + \max(w_{21}, w_{22})$ in accordance with Inference Rule 1.

Figure 15:
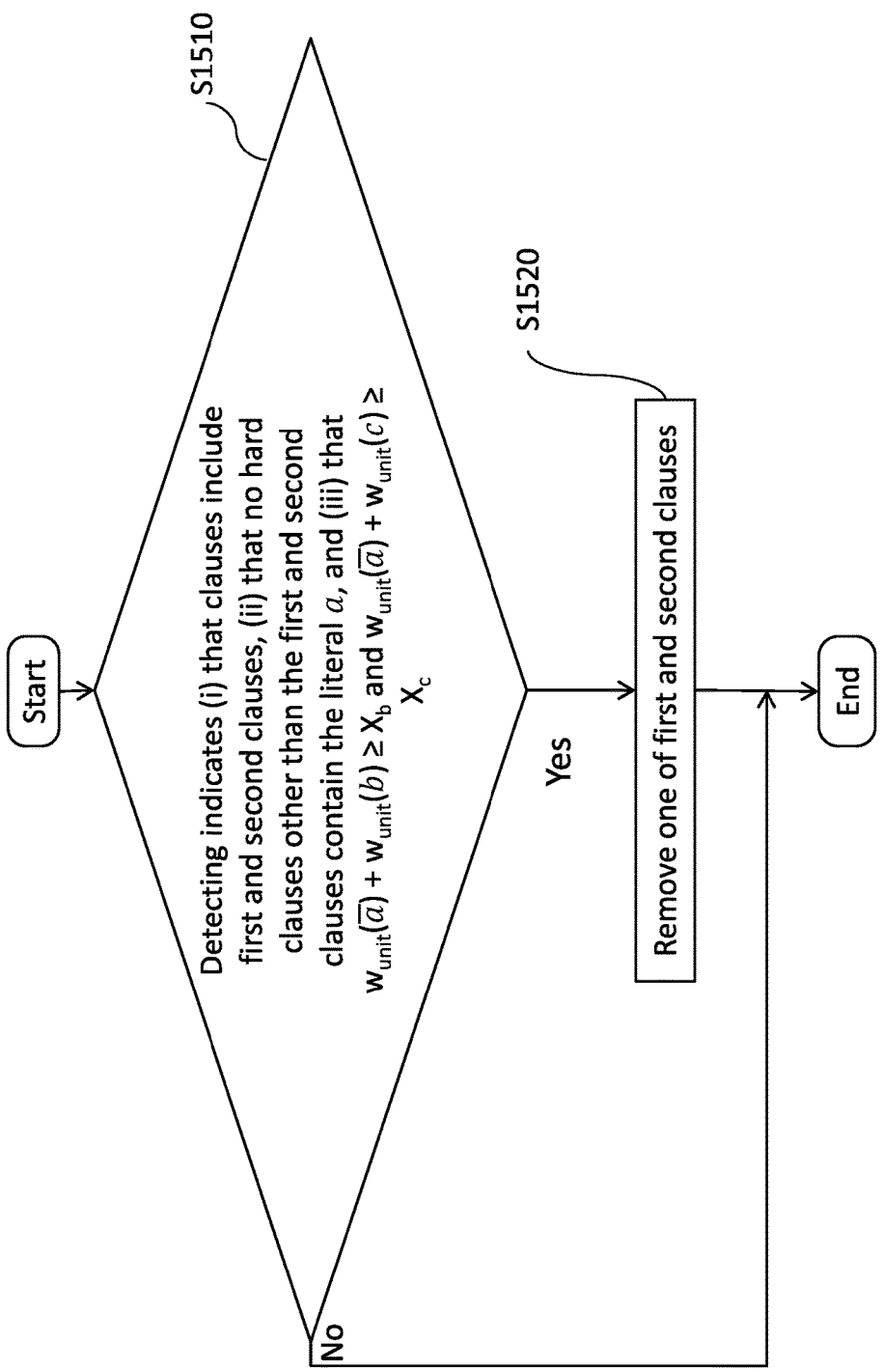
FIG. 15 shows an alternative example operational flow of step S930 in FIG. 9.

FIG. 15 shows an alternative example operational flow of step S930 in FIG. 9. In the example of FIG. 15, it is assumed for simplicity that the apparatus 100 has only performed detection of the conditions of Inference Rule 2 with respect to the logical variable a in step S910. If the conditions of Inference Rule 2 are satisfied, the apparatus 100 simplifies the clauses in accordance with the rule. That is, if the detecting by the detecting section 130 indicates (i) that the plurality of clauses includes the first clause $(a \vee b, H)$ and the second clause $(a \vee c, H)$, (ii) that no hard clauses in the plurality of clauses other than the first and second clauses contain the literal a, and (iii) that $w_{unit}(\bar{a}) + w_{unit}(b) \geq X_b$ and $w_{unit}(\bar{a}) + w_{unit}(c) \geq X_c$ ("Yes" at S1510), the clause simplifying section 140 modifies the plurality of clauses according to the assumption that b=c. Under the assumption that b=c, the first clause $(a \vee b, H)$ and the second clause $(a \vee c, H)$ are equivalent. Thus, the clause simplifying section 140 may remove one of the first and second clauses.

FIGS. 14 and 15 are only simple examples of sub-flows of step S930 in FIG. 9, each illustrating the simplifying of a plurality of clauses in response to the detection of conditions for only a single inference rule. As noted above, step S910 may include the detection of conditions for a plurality of rules, including rules other than Inference Rule 1 and Inference Rule 2. In such cases, step 930 may include both the sub-flow of FIG. 14 and the sub-flow of FIG. 15 as well as other sub-flows for other rules. Rules may yield overlapping or redundant inferences, and such combined sub-flows need not be performed sequentially.

Figure 16:
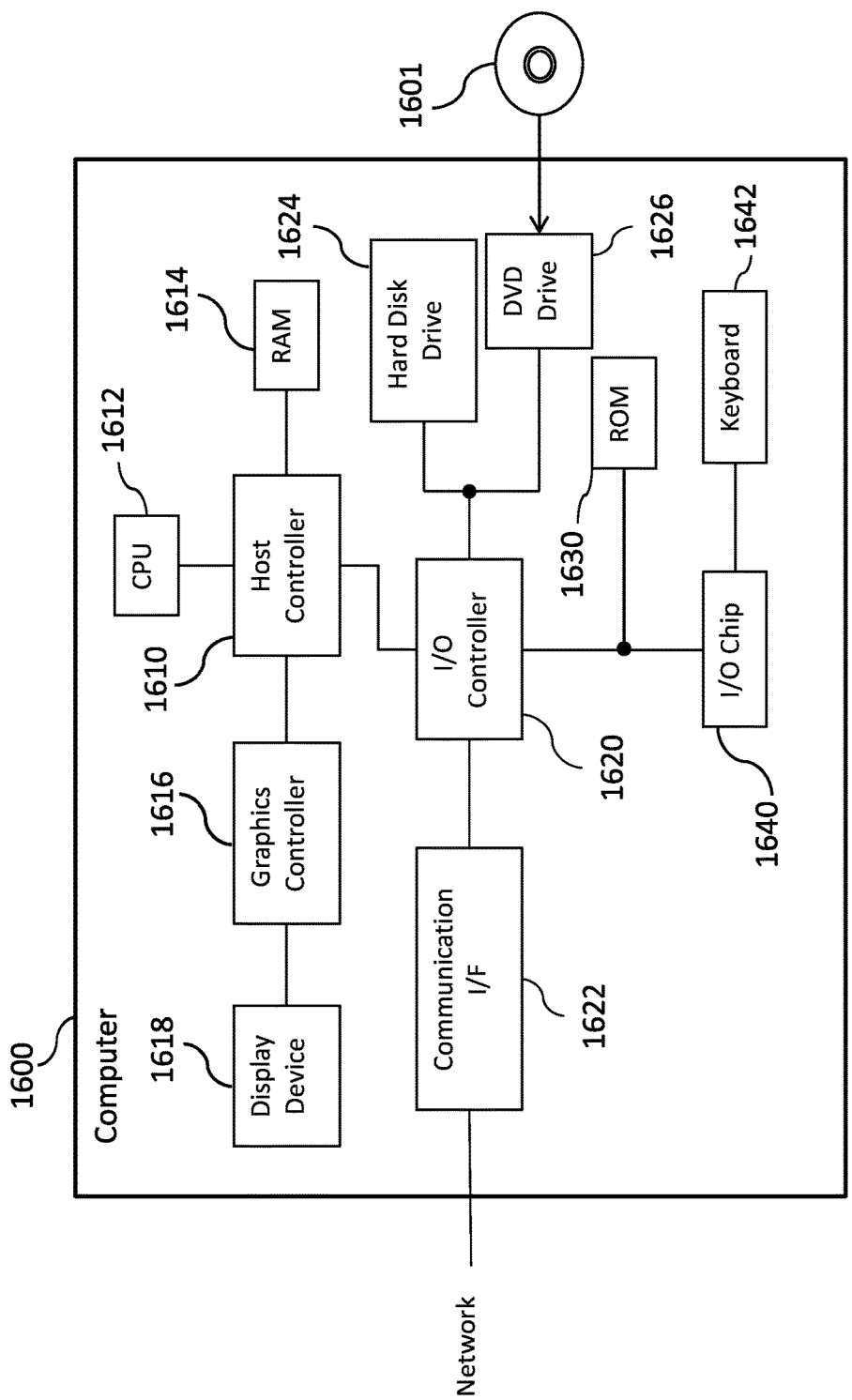
FIG. 16 shows an example of a computer 1600 in which the apparatus 100, the operational flow of FIG. 2, and/or other embodiments of the claimed invention may be wholly or partly embodied.

FIG. 16 shows an example of a computer 1600 in which the apparatus 100, the operational flow of FIG. 2, and/or other embodiments of the claimed invention may be wholly or partly embodied. The computer 1600 according to the present embodiment includes a CPU 1612, a RAM 1614, a graphics controller 1616, and a display device 1618, which are mutually connected by a host controller 1610. The computer 1600 also includes input/output units such as a communication interface 1622, a hard disk drive 1624, and a DVD-ROM drive 1626, which are connected to the host controller 1610 via an input/output controller 1620. The computer also includes legacy input/output units such as a ROM 1630 and a keyboard 1642, which is connected to the input/output controller 1620 through an input/output chip 1640.

The host controller 1610 connects the RAM 1614 with the CPU 1612 and the graphics controller 1616, which access the RAM 1614 at a high transfer rate. The CPU 1612 operates according to programs stored in the ROM 1630 and the RAM 1614, thereby controlling each unit. The graphics controller 1616 obtains image data generated by the CPU 1612 on a frame buffer or the like provided in the RAM 1614, and causes the image data to be displayed on the display device 1618. Alternatively, the graphics controller 1616 may contain therein a frame buffer or the like for storing image data generated by the CPU 1612.

The input/output controller 1620 connects the host controller 1610 with the communication interface 1622, the hard disk drive 1624, and the DVD-ROM drive 1626, which are relatively high-speed input/output units. The communication interface 1622 communicates with other electronic devices via a network. The hard disk drive 1624 stores programs and data used by the CPU 1612 within the computer 1600. The DVD-ROM drive 1626 reads the programs or the data from the DVD-ROM 1601, and provides the hard disk drive 1624 with the programs or the data via the RAM 1614.

The ROM 1630 and the keyboard 1642 and the input/output chip 1640, which are relatively low-speed input/output units, are connected to the input/output controller 1620. The ROM 1630 stores therein a boot program or the like executed by the computer 1600 at the time of activation, a program depending on the hardware of the computer 1600. The keyboard 1642 inputs text data or commands from a user, and may provide the hard disk drive 1624 with the text data or the commands via the RAM 1614. The input/output chip 1640 connects the keyboard 1642 to the input/output controller 1620, and may connect various input/output units via a parallel port, a serial port, a keyboard port, a mouse port, and the like to the input/output controller 1620.

A program to be stored on the hard disk drive 1624 via the RAM 1614 is provided by a recording medium such as the DVD-ROM 1601 or an IC card. The program is read from the recording medium, installed into the hard disk drive 1624 within the computer 1600 via the RAM 1614, and executed in the CPU 1612.

A program that is installed in the computer 1600 can cause the computer 1600 to function as an apparatus such as the apparatus 100 of FIG. 1. Such a program may act on the CPU 1612 to cause the computer 1600 to function as some or all of the sections, components, elements, databases, etc. of the apparatus 100 of FIG. 1 (e.g., the detecting section 130, the clause simplifying section 140, etc.).

A program that is installed in the computer 1600 can also cause the computer 1600 to perform an operational flow such as the operational flow of FIG. 2. Such a program may act on the CPU 1612 to cause the computer 1600 to perform some or all of the steps of FIG. 2 (e.g., apply rules S220, determine optimal assignment S230, etc.).

The information processing described in these programs is read into the computer 1600, resulting in the cooperation between a program and the above-mentioned various types of hardware resources. An apparatus or method may be constituted by realizing the operation or processing of information in accordance with the usage of the computer 1600.

For example, when communication is performed between the computer 1600 and an external device, the CPU 1612 may execute a communication program loaded onto the RAM 1614 to instruct communication processing to the communication interface 1622, based on the processing described in the communication program.

The communication interface 1622, under control of the CPU 1612, reads transmission data stored on a transmission buffering region provided in a recording medium such as the RAM 1614, the hard disk drive 1624, or the DVD-ROM 1601, and transmits the read transmission data to a network or writes reception data received from a network to a reception buffering region or the like provided on the recording medium. In this way, the communication interface 1622 may exchange transmission/reception data with a recording medium by a DMA (direct memory access) method or by a configuration in which the CPU 1612 reads the data from the recording medium or the communication interface 1622 of a transfer destination and writes the data into the communication interface 1622 or the recording medium of the transfer destination, so as to transfer the transmission/reception data.

In addition, the CPU 1612 may cause all or a necessary portion of a file or a database to be read into the RAM 1614 such as by DMA transfer, the file or the database having been stored in an external recording medium such as the hard disk drive 1624, the DVD-ROM drive 1626 (DVD-ROM 1601) and perform various types of processing on the data on the RAM 1614. The CPU 1612 may then write back the processed data to the external recording medium by means of a DMA transfer method or the like. In such processing, the RAM 1614 can be considered to temporarily store the contents of the external recording medium, and so the RAM 1614, the external recording apparatus, and the like are collectively referred to as a memory, a storage section, a recording medium, a computer readable medium, etc.

Various types of information, such as various types of programs, data, tables, and databases, may be stored in the recording apparatus to undergo information processing. Note that the CPU 1612 may also use a part of the RAM 1614 to perform reading/writing thereto on a cache memory. In such an embodiment, the cache is considered to be contained in the RAM 1614, the memory, and/or the recording medium unless noted otherwise, since the cache memory performs part of the function of the RAM 1614.

The CPU 1612 may perform various types of processing on the data read from the RAM 1614, which includes various types of operations, processing of information, condition judging, search/replace of information, etc., as described throughout this disclosure and designated by an instruction sequence of programs, and writes the result back to the RAM 1614. For example, when performing condition judging, the CPU 1612 may judge whether each type of variable is larger, smaller, no smaller than, no greater than, or equal to the other variable or constant, and when the condition judging results in the affirmative (or in the negative), the process branches to a different instruction sequence or calls a subroutine.

In addition, the CPU 1612 may search for information in a file, a database, etc., in the recording medium. For example, when a plurality of entries, each having an attribute value of a first attribute is associated with an attribute value of a second attribute, are stored in a recording apparatus, the CPU 1612 may search for an entry matching the condition whose attribute value of the first attribute is designated, from among the plurality of entries stored in the recording medium, and reads the attribute value of the second attribute stored in the entry, thereby obtaining the attribute value of the second attribute associated with the first attribute satisfying the predetermined condition.

The above-explained program or module may be stored in an external recording medium. Exemplary recording mediums include a DVD-ROM 1601, as well as an optical recording medium such as a Blu-ray Disk or a CD, a magneto-optic recording medium such as a MO, a tape medium, and a semiconductor memory such as an IC card. In addition, a recording medium such as a hard disk or a RAM provided in a server system connected to a dedicated communication network or the Internet can be used as a recording medium, thereby providing the program to the computer 1600 via the network.

The present invention may be a system, a method, and/or a computer program product. The computer program product may include a computer readable storage medium (or media) having computer readable program instructions thereon for causing a processor to carry out aspects of the present invention.

The computer readable storage medium can be a tangible device that can retain and store instructions for use by an instruction execution device. The computer readable storage medium may be, for example, but is not limited to, an electronic storage device, a magnetic storage device, an optical storage device, an electromagnetic storage device, a semiconductor storage device, or any suitable combination of the foregoing.

A non-exhaustive list of more specific examples of the computer readable storage medium includes the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network may comprise copper transmission cables, optical transmission fibers, wireless transmission, routers, firewalls, switches, gateway computers, and/or edge servers. A network adapter card or network interface in each computing/processing device receives computer readable program instructions from the network and forwards the computer readable program instructions for storage in a computer readable storage medium within the respective computing/processing device.

Computer readable program instructions for carrying out operations of the present invention may be assembler instructions, instruction-set-architecture (ISA) instructions, machine instructions, machine dependent instructions, microcode, firmware instructions, state-setting data, or either source code or object code written in any combination of one or more programming languages, including an object oriented programming language such as Smalltalk, C++ or the like, and conventional procedural programming languages, such as the "C" programming language or similar programming languages. The computer readable program instructions may execute entirely on the user's computer, partly on the user's computer, as a stand-alone software package, partly on the user's computer and partly on a remote computer or entirely on the remote computer or server.

In the latter scenario, the remote computer may be connected to the user's computer through any type of network, including a local area network (LAN) or a wide area network (WAN), or the connection may be made to an external computer (for example, through the Internet using an Internet Service Provider). In some embodiments, electronic circuitry including, for example, programmable logic circuitry, field-programmable gate arrays (FPGA), or programmable logic arrays (PLA) may execute the computer readable program instructions by utilizing state information of the computer readable program instructions to personalize the electronic circuitry, in order to perform aspects of the present invention.

Aspects of the present invention are described herein with reference to flowchart illustrations and/or block diagrams of methods, apparatus (systems), and computer program products according to embodiments of the invention. It will be understood that each block of the flowchart illustrations and/or block diagrams, and combinations of blocks in the flowchart illustrations and/or block diagrams, can be implemented by computer readable program instructions.

These computer readable program instructions may be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks.

These computer readable program instructions may also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks.

The computer readable program instructions may also be loaded onto a computer, other programmable data processing apparatus, or other device to cause a series of operational steps to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the figures illustrate the architecture, functionality, and operation of possible implementations of systems, methods, and computer program products according to various embodiments of the present invention. In this regard, each block in the flowchart or block diagrams may represent a module, segment, or portion of instructions, which comprises one or more executable instructions for implementing the specified logical function(s).

In some alternative implementations, the functions noted in the block may occur out of the order noted in the figures. For example, two blocks shown in succession may, in fact, be executed substantially concurrently, or the blocks may sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the embodiment(s) of the present invention has (have) been described, the technical scope of the invention is not limited to the above described embodiment(s). It is apparent to persons skilled in the art that various alterations and improvements can be added to the above-described embodiment(s). It is also apparent from the scope of the claims that the embodiments added with such alterations or improvements can be included in the technical scope of the invention.

The operations, procedures, steps, and stages of each process performed by an apparatus, system, program, and method shown in the claims, embodiments, or diagrams can be performed in any order as long as the order is not indicated by "prior to," "before," or the like and as long as the output from a previous process is not used in a later process. Even if the process flow is described using phrases such as "first" or "next" in the claims, embodiments, or diagrams, it does not necessarily mean that the process must be performed in this order.

APPENDIX

Preliminaries.

First, we introduce some notations. For any literal l, var (l) represents the variable to which literal l refers to. This means that $var(x_i)=var(\overline{x_i})=x_i$ for any variable $x_i$. A weighted clause (c, w) is a pair of a clause c and its weight w, where w is a non-negative integer or $\infty$. A clause c that does not appear in a formula $\Phi$ is sometimes regarded as a part of $\Phi$ with weight zero. That is, we sometimes assume that (c, $0) \in \Phi$ even if clause c is not contained in $\Phi$. A weighted clause with weight $\infty$ is often referred to as a hard clause, and the other clauses are called soft. Empty clause $\square$ cannot be satisfied, and tautology clause T is always satisfied. An assignment I for a formula $\Phi$ is a function I: $X \rightarrow \{TRUE, FALSE\}^n$, where X is the set of variables. Given a formula $\Phi$ and its assignment I, cost ($\Phi$, I) denotes the sum of the weights of the clauses unsatisfied by L. (Note that it is customary to regard the MAX SAT problem as minimizing the sum of the weights of the unsatisfied clauses rather than maximizing the sum of the weights of the satisfied clauses.)

Hence our objective is to find an assignment I that minimizes cost($\Phi$, I). A unit clause is a clause that consists of exactly one literal, and a binary clause is a clause that consists of exactly two literals. For a literal l in formula $\Phi$, $\Phi(l)$ denotes the subset of the clauses in $\Phi$ that contains literal l.

For any clause c in formula $\Phi$, $w_{all}(c)$ denotes the sum of the weights of all clauses that contain all of the literals in c, and $w_{unit}(c)$ denotes the weight of clause c. For example, given a formula $\Phi=\{(x_1 \vee x_2 \vee x_3, 1), (x_1, 2)\}$, we have $w_{all}(x_1)=3$, $w_{all}(x_1 \vee 63\ x_2)=1$, (note here that the two literals $x_1$ and $x_2$ are contained in clause $x_1 \vee x_2 \vee x_3$), $w_{unit}(x_1)=2$, and $w_{unit}(x_1 \vee x_2)=0$.

We say that two formulas $\Phi$ and $\Phi'$ are equivalent $\Phi \equiv \Phi'$ if the costs of the optimum assignments of these formulas are equal. Given a formula $\Phi$ with literals $l_1$ and $l_2$, $\Phi|_{l_1}$ denotes the formula obtained by setting $l_1$=TRUE, and $\Phi|_{l_1=l_2}$ denotes the formula obtained by setting $l_1=l_2$.

Lemma 8 (Degree-2 Not-Equal Soft Clause Rule).

If an input formula $\Phi$ can be represented as $$\Phi=\{(a,w_0),(a \vee b, w_{11}),(\overline{a} \vee \overline{b}, w_{12}),(a \vee c, w_{21}),(\overline{a} \vee \overline{c}, w_{22})\} \cup \Phi_0,$$

$\Phi_0$ does not contain var(a), and $$\min\{w_{11},w_{12}\} \geq w_0 + \max\{w_{21},w_{22}\}$$

then we have $\Phi \equiv \Phi|_{a \neq b}$. This means that $$\left\{\begin{array}{l}(a, w_0),\\(a \vee b, w_{11}),\\(\overline{a} \vee \overline{b}, w_{12}),\\(a \vee c, w_{21}),\\(\overline{a} \vee \overline{c}, w_{22})\end{array}\right\} \cup \Phi_0 \equiv \left\{\begin{array}{l}(\overline{b}, w_0),\\(\overline{b} \vee c, w_{21}),\\(b \vee \overline{c}, w_{22})\end{array}\right\} \cup \Phi_0.$$

Proof.

Let $\Phi'=\Phi \backslash \Phi_0$. We consider the two cases (i) b$\neq$c and (ii) b=c separately. Suppose that (i) b$\neq$c. Let $I_{a \neq c}^*$ be the optimum assignment under the condition that a$\neq$c for $\Phi$. Having that a$\neq$c and b$\neq$c yield a=b, we have cost($\Phi'$, $I_{a \neq c}^*) \geq \min\{w_{11},w_{12}\}$ since one of the two clauses (a$\vee$b, $w_{11}$) and ($\overline{a} \vee \overline{b}$, $w_{12}$) is unsatisfied. Let $I_{a \neq b}$ be the assignment obtained by flipping the value of literal a from $I_{a \neq c}^*$. Since a$\neq$b$\neq$c means that a=c, we have cost($\Phi'$, $I_{a \neq b}) \geq w_0 + \max\{w_{21}, w_{22}\}$. From the assumption $\min\{w_{11}, w_{12}\} \geq w_0 + \max\{w_{21}, w_{22}\}$, we have cost($\Phi'$, $I_{a \neq b}) \leq$ cost($\Phi'$, $I_{a \neq c}^*$). By the definition of $I_{a \neq c}^*$ and $I_{a \neq b}$, the costs associated with the clauses in $\Phi_0$ are the same for $I_{a \neq c}^*$ and $I_{a \neq b}$ because literal a does not appear in any clause in $\Phi_0$ by the assumption. Hence we have cost($\Phi'$, $I_{a \neq c}^*$)$-$cost($\Phi'$,$I_{a \neq b}$)=cost($\Phi$, $I_{a \neq c}^*$)$-$cost($\Phi$, $I_{a \neq b}$). Therefore we have cost($\Phi$, $I_{a \neq c}^*$)$\geq$cost ($\Phi$, $I_{a \neq b}$)$\geq$cost($\Phi$, $I_{a \neq b}^*$) where $I_{a \neq b}^*$ is the optimum assignment under the condition that a$\neq$b for $\Phi$. This inequality means that $\Phi \equiv \Phi|_{a \neq b}$ since we assume (i).

Suppose that (ii) b=c. Then we have cost($\Phi'$, $I_{a=b}^*) \geq \min\{w_{11},w_{12}\}+\min\{w_{21}, w_{22}\}=w_{12}+(w_{21}+w_{22})-\max\{w_{21}, w_{22}\}$, where $I_{a=b}^*$ is the optimum assignment under the condition that a=b for $\Phi$ and the last equality is due to the fact $w_{21}+w_{22}=\min\{w_{21}, w_{22}\}+\max\{w_{21}, w_{22}\}$. We also have cost($\Phi'$, $I_{a \neq b}) \leq w_0$, where $I_{a \neq b}$ is the assignment obtained by flipping the value of literal a from $I_{a=b}$. From the assumption $\min\{w_{11}, w_{12}\} \geq w_0 + \max\{w_{21}, w_{22}\}$, we know that cost($\Phi'$, $I_{a=b}^*$)$\geq$cost($\Phi'$, $I_{a \neq b}$). By the definition of $I_{a=b}^*$ and $I_{a \neq b}$, the costs associated with the clauses in $\Phi_0$ are the same for $I_{a=b}^*$ and $I_{a \neq b}$ because literal a does not appear in any clause in $\Phi_0$. Hence we know that cost($\Phi'$, $I_{a=b}^*$)$-$cost ($\Phi'$, $I_{a \neq b}$)=cost($\Phi$, $I_{a=b}^*$)$-$cost($\Phi$, $I_{a \neq b}$). Therefore we know that cost($\Phi$, $I_{a=b}^*$)≥cost($\Phi$,$I_{a\neq b}$)≥cost($\Phi$, $I_{a\neq b}^*$) where $I_{a\neq b}^*$ is the optimum assignment under the condition that a≠b for $\Phi$. This inequality means that $\Phi \equiv \Phi|_{a\neq b}$ as desired.

Lemma 10 (Degree-2 Hard Binary Clause Rule).

Let $\Phi_\vee(l_1,l_2)$ be the set of the clauses that contain at least one of the literals $l_1$ or $l_2$, and let $\Phi_{hard}(l)$ be the set of the hard clauses that contain literal l in $\Phi$. If $|\Phi_{hard}(u)|=2$ and all of the clauses in $\Phi_{hard}(u)$ are binary (that is, we can represent $\Phi_{hard}(u)=\{(u\vee v_1, \infty), (u\vee v_2, \infty)\}$ by using two literals $v_1$ and $v_2$) and formula $\Phi$ satisfies $$w_{unit}(\overline{u}) + w_{unit}(v_1) \geq \sum_{(c,w)\in\Phi_\vee(u,\overline{v_1})\backslash\Phi_{hard}(u)} w \quad (1)$$

and $$w_{unit}(\overline{u}) + w_{unit}(v_2) \geq \sum_{(c,w)\in\Phi_\vee(u,\overline{v_2})\backslash\Phi_{hard}(u)} w, \quad (2)$$

then we have $\Phi \equiv \Phi|_{v_1=v_2}$.

Proof.

To prove this lemma, it is enough to show cost($I_{v_1=v_2}$) ≤cost($I_{v_2\neq v_2}$), where $I_{v_1=v_2}^*$ and $I_{v_1\neq v_2}^*$ are the optimum assignments for $\Phi$ under the constraints that $v_1=v_2$ and $v_1\neq v_2$, respectively. To do so, we consider two cases: (i) ($v_1$, $v_2$)=(FALSE, TRUE) and (ii) ($v_1$, $v_2$)=(TRUE, FALSE) in assignment $I_{v_1\neq v_2}^*$. Here, we show cost($I_{v_1=v_2}^*$)≤cost($I_{v_1\neq v_2}$) only for Case (i) by using Inequality (1), and we omit the proof for Case (ii) because Case (ii) can be proved similarly using Inequality (2). In Case (i), $v_1$=FALSE means that u=TRUE in $l_{v_1\neq v_2}^*$ because P includes the hard clause (u$\vee v_1$, $\infty$). Let $I_{v_1=v_2}$ be the assignment obtained by flipping the assignments for $v_1$ and u from $l_{v_1\neq v_2}^*$. Specifically, $v_1=v_2$=TRUE and u=FALSE in $I_{v_1=v_2}$ and the assignment for the other variables are same in $I_{v_1\neq v_2}^*$ and $I_{v_1=v_2}$. By the construction of $I_{v_1=v_2}$, the unsatisfied unit clauses ($\overline{u}$, $w_{\overline{u}}$) and ($v_1$, $w_{v_1}$) (if any) in $I_{v_1\neq v_2}^*$ become satisfied in $I_{v_1=v_2}$, and that the satisfied clauses associated with at least one of the two literals u and $\overline{v_1}$ in $I_{v_1=v_2}^*$ might become unsatisfied in $I_{v_1=v_2}$. These facts mean that $$\text{cost}(\Phi, I_{v_1\neq v_2}^*) - \text{cost}(\Phi, I_{v_1=v_2}) \geq$$

$$w_{unit}(\overline{u}) + w_{unit}(v_1) - \sum_{(c,w)\in\Phi_\vee(u,\overline{v_1})\backslash\Phi_{hard}(u)} w \geq 0,$$

where we use Inequality (1) for the last inequality. Hence we have cost($\Phi$, $I_{v_1=v_2}$)≥cost($\Phi$,$I_{v_1=v_2}$)≥cost($\Phi$,$I^*_{v_1=v_2}$), where the last inequality is immediate from the definition of $I_{v_1=v_2}^*$.

What is claimed is:

1. A computer-implemented method comprising:
    obtaining, via a physical input component of a computing device, a plurality of clauses associated with a graph representing a data structure having a plurality of vertices and a plurality of weighted edges connecting the vertices, the graph representing an arrangement of communication devices in a communication network and the graph displayed on a display interface operated by a user;
    storing the plurality of clauses in a clause storage;
    detecting, via a detecting section, (i) whether any clauses in the plurality of clauses stored in the clause storage other than a first clause (a$\vee$b, $w_{11}$), a second clause ($\overline{a}\vee\overline{b}$, $w_{12}$), a third clause (a$\vee$c, $w_{21}$), a fourth clause ($\overline{a}\vee\overline{c}$, $w_{22}$), and a fifth clause (a, $w_0$), where a is a first logical variable, b is a second logical variable, c is a third logical variable, and $w_{11}$, $w_{12}$, $w_{21}$, and $w_{22}$ are weights, include a literal of the first logical variable a and a non-zero weight and, (ii) whether min($w_{11}$, $w_{12}$)≥$w_0$+max($w_{21}$,$w_{22}$);
    storing, in a memory, a modified graph having a modified data structure including the plurality of vertices and corresponding clauses having only the non-zero weight;
    simplifying, via a clause simplifying section, the plurality of clauses stored in the clause storage using a processor to generate a plurality of simplified clauses, on the basis of the detecting, the simplifying including modifying the plurality of clauses according to the assumption that a≠b if the detecting indicates (i) that no clauses in the plurality of clauses stored in the clause storage other than the first, second, third, fourth, and fifth clauses include a literal of the first logical variable a and a non-zero weight and (ii) that min($w_{11}$,$w_{12}$)≥$w_0$+max ($w_{21}$,$w_{22}$);
    determining, via an assignment determining section, an optimal assignment of values to a plurality of logical variables associated with the clauses having only the non-zero weight to find a solution to a maximum cut problem of the graph for producing practical results to reduce computations for finding a solution to a maximum satisfiability (MAX-SAT) instance by determining whether each vertex of the plurality of vertices is in a maximum cut subset; and
    outputting the plurality of simplified clauses to an output component, the output component configured to load the plurality of simplified clauses to a server through the communication network and configured to display the plurality of simplified clauses to the display interface.

2. The method of claim 1, wherein the modifying includes replacing any clauses having non-zero weight from among the first, second, third, fourth, and fifth clauses with a replacement first clause (T, $w_{r11}$), a replacement second clause (T, $w_{r12}$), a replacement third clause ($\overline{b}\vee c$, $w_{r21}$) or (a$\vee$r, $w_{r21}$), a replacement fourth clause (b$\vee\overline{c}$, $w_{r22}$) or ($\overline{a}\vee\overline{c}$, $w_{r22}$), and a replacement fifth clause ($\overline{b}$, $w_{r0}$) or (a, $w_{r0}$), respectively, if the detecting indicates (i) that no clauses in the plurality of clauses other than the first, second, third, fourth, and fifth clauses include a literal of the first logical variable a and a non-zero weight and (ii) that min($w_{11}$,$w_{12}$)≥$w_0$+max($w_{21}$, $w_{22}$),
    wherein $w_{r11}$, $w_{r12}$, $w_{r21}$, $w_{r22}$, and $w_{r0}$ are substantially equal to $w_{11}$, $w_{12}$, $w_{21}$, $w_{22}$, and $w_0$, respectively, and "T" signifies a tautologically satisfied disjunction that is satisfied by any assignment of values to a plurality of logical variables.

3. The method of claim 2, wherein $w_{r11}$, $w_{r12}$, $w_{r21}$, $w_{r22}$, and $w_{r0}$ are equal to $w_{11}$, $w_{12}$, $w_{21}$, $w_{22}$, and $w_0$, respectively.

4. The method of claim 1, wherein the optimal assignment of values is determined so as to maximize the sum of the weights of clauses satisfied by the assignment.

5. The method of claim 4, further comprising summing the weights of clauses satisfied by the optimal assignment of values, the resulting sum including $w_{11}$ and $w_{12}$ if the detecting indicates (i) that no clauses in the plurality of clauses other than the first, second, third, fourth, and fifth clauses include a literal of the first logical variable a and, a non-zero weight and (ii) that min($w_{11}$,$w_{12}$)≥$w_0$+max($w_{21}$, $w_{22}$), wherein the resulting sum represents the benefit of the optimal assignment of values.

6. The method of claim 4, further comprising summing the weights of clauses not satisfied by the optimal assignment of values, the resulting sum not including $w_{11}$ or $w_{12}$ if the detecting indicates (i) that no clauses in the plurality of clauses other than the first, second, third, fourth, and fifth clauses include a literal of the first logical variable a and a non-zero weight, and (ii) that $\min(w_{11},w_{12}) \geq w_0 + \max(w_{21}, w_{22})$, wherein the resulting sum represents the cost of the optimal assignment of values.

7. The method of claim 4, wherein:
each vertex of the plurality of vertices is represented by one of the plurality of logical variables and the plurality of clauses includes two clauses $(u \lor v, w_{uv})$ and $(\overline{u} \lor \overline{v}, w_{uv})$ for each edge of the plurality of weighted edges, where u and v are logical variables representing the vertices connected by the edge and $w_{uv}$ is the weight associated with the edge; and
the maximum cut problem involves finding a subset of vertices among the plurality of vertices such that a sum of the weights of the edges connecting vertices in the subset with vertices not in the subset is maximized.

8. The method of claim 7, wherein the obtaining includes generating the plurality of clauses based on the graph.

9. The method of claim 1,
wherein the detecting includes confirming that the number of clauses in the list of clauses for the first logical variable a is not more than a threshold before detecting one or more of (i) whether any clauses in the plurality of clauses other than the first, second, third, fourth, and fifth clauses include a literal of the first logical variable a and a non-zero weight and (ii) whether $\min(w_{11}, w_{12}) \geq w_0 + \max(w_{21}, w_{22})$.

10. The method of claim 1, further comprising repeating the detecting after the simplifying.

11. A computer-implemented method comprising:
obtaining, via a physical input component of a computing device, a plurality of clauses associated with a graph representing a data structure having a plurality of vertices and a plurality of weighted edges connecting the vertices, the graph representing an arrangement of communication devices in a communication network and the graph displayed on a display interface operated by a user;
storing the plurality of clauses in a clause storage;
detecting, via a detecting section, (i) whether the plurality of clauses stored in the clause storage include a first clause $(a \lor b, H)$ and a second clause $(a \lor c, H)$, where a is a first logical variable, b is a second logical variable, c is a third logical variable, and a weight of H signifies a hard clause that must be satisfied by any assignment of values to a plurality of logical variables, (ii) whether any hard clauses in the plurality of clauses other than the first and second clauses include the literal a, and (iii) whether $w_{unit}(\overline{a}) + w_{unit}(b) \geq X_b$ and $w_{unit}(\overline{a}) + w_{unit}(c) \geq X_c$, where $w_{unit}(\overline{a})$ is the weight $w_1$ of a clause $(\overline{a}, w_1)$ included in the plurality of clauses, $w_{unit}(b)$ is the weight $w_2$ of a clause $(b, w_2)$ included in the plurality of clauses, $w_{unit}(c)$ is the weight $w_3$ of a clause $(c, w_3)$ included in the plurality of clauses, $X_b$ is the sum of the weights of all clauses in the plurality of clauses stored in the clause storage, other than hard clauses including the literal a, that include at least one of the literals a and b, and $X_c$ is the sum of the weights of all clauses in the plurality of clauses stored in the clause storage, other than hard clauses including the literal a, that include at least one of the literals a and $\overline{c}$;
storing, in a memory, a modified graph having a modified data structure including the plurality of vertices and corresponding clauses having a non-zero weight;
simplifying, via a clause simplifying section, the plurality of clauses stored in the clause storage using a processor to generate a plurality of simplified clauses, on the basis of the detecting, the simplifying including modifying the plurality of clauses according to the assumption that b=c if the detecting indicates (i) that the plurality of clauses include the first and second clauses, (ii) that no hard clauses in the plurality of clauses stored in the clause storage other than the first and second clauses include the literal a, and (iii) that $w_{unit}(\overline{a}) + w_{unit}(b) \geq X_b$ and $w_{unit}(\overline{a}) + w_{unit}(c) \geq X_c$;
determining, via an assignment determining section, an optimal assignment of values to a plurality of logical variables associated with the clauses having only the non-zero weight to find a solution to a maximum cut problem of the graph for producing practical results to reduce computations for finding a solution to a maximum satisfiability (MAX-SAT) instance by determining whether each vertex of the plurality of vertices is in a maximum cut subset; and
outputting the plurality of simplified clauses to an output component, the output component configured to load the plurality of simplified clauses to a server through the communication network and configured to display the plurality of simplified clauses to the display interface.

12. The method of claim 11, wherein the modifying includes removing one of the first and second clauses if the detecting indicates (i) that the plurality of clauses includes the first and second clauses, (ii) that no hard clauses in the plurality of clauses other than the first and second clauses include the literal a, and (iii) that $w_{unit}(\overline{a}) + w_{unit}(b) \geq X_b$ and $w_{unit}(\overline{a}) + w_{unit}(c) \geq X_c$.

13. The method of claim 11, wherein the optimal assignment of values is determined so as to maximize the sum of the weights of clauses satisfied by the assignment.

14. The method of claim 13, further comprising summing the weights of clauses satisfied by the optimal assignment of values, the resulting sum representing the benefit of the optimal assignment of values.

15. The method of claim 13, further comprising summing the weights of clauses not satisfied by the optimal assignment of values, the resulting sum representing a cost of the optimal assignment of values.

16. The method of claim 13, wherein:
each vertex of the plurality of vertices is represented by one of the plurality of logical variables and the plurality of clauses includes a clause $(\overline{v}, 1)$ for each vertex of the plurality of vertices and a clause $(u \lor v, H)$ for each edge of the plurality of edges, where u and v are logical variables representing the vertices connected by the edge; and
the minimum vertex cover problem involves finding a set of vertices with minimum size among the plurality of vertices such that, for each of the plurality of edges, the set of vertices includes at least one of the two vertices connected by the edge.

17. The method of claim 16, wherein the obtaining includes generating the plurality of clauses based on the graph.

18. The method of claim 11, wherein the detecting includes:

confirming that the number of hard clauses in the list of clauses for the first logical variable a is not more than a threshold before detecting one or more of (i) whether the plurality of clauses includes the first and second clauses, (ii) whether any hard clauses in the plurality of clauses other than the first and second clauses include the literal a, and (iii) whether $w_{unit}(\bar{a})+w_{unit}(b) \geq X_b$ and $w_{unit}(\bar{a})+w_{unit}(c) \geq X_c$.

19. A non-transitory computer readable storage medium having instructions embodied therewith, the instructions executable by a processor to cause the processor to perform operations comprising:

obtaining, via a physical input component of a computing device, a plurality of clauses associated with a graph representing a data structure having a plurality of vertices and a plurality of weighted edges connecting the vertices, the graph representing an arrangement of communication devices in a communication network and the graph displayed on a display interface operated by a user;

storing the plurality of clauses in a clause storage;

detecting, via a detecting section, (i) whether any clauses in the plurality of clauses stored in the clause storage other than a first clause $(a \lor b, w_{11})$, a second clause $(\bar{a} \lor \bar{b}, w_{12})$, a third clause $(a \lor c, w_{21})$, a fourth clause $(\bar{a} \lor \bar{c}, w_{22})$, and a fifth clause $(a, w_0)$, where a is a first logical variable, b is a second logical variable, c is a third logical variable, and $w_{11}$, $w_{12}$, $w_{21}$, and $w_{22}$ are weights, include a literal of the first logical variable a and a non-zero weight and, (ii) whether $\min(w_{11}, w_{12}) \geq w_0 + \max(w_{21}, w_{22})$;

storing, in a memory, a modified graph having a modified data structure including the plurality of vertices and corresponding clauses having a non-zero weight;

simplifying, via a clause simplifying section, the plurality of clauses stored in the clause storage using a processor to generate a plurality of simplified clauses on the basis of the detecting, the simplifying including modifying the plurality of clauses according to the assumption that $a \neq b$ if the detecting indicates (i) that no clauses in the plurality of clauses stored in the clause storage other than the first, second, third, fourth, and fifth clauses include a literal of the first logical variable a and a non-zero weight and (ii) that $\min(w_{11}, w_{12}) \geq w_0 + \max(w_{21}, w_{22})$;

determining, via an assignment determining section, an optimal assignment of values to a plurality of logical variables associated with the clauses having only the non-zero weight to find a solution to a maximum cut problem of the graph for producing practical results to reduce computations for finding a solution to a maximum satisfiability (MAX-SAT) instance by determining whether each vertex of the plurality of vertices is in a maximum cut subset; and outputting the plurality of simplified clauses to an output component, the output component configured to load the plurality of simplified clauses to a server through the communication network and configured to display the plurality of simplified clauses to the display interface.

20. An apparatus comprising:

the computer readable storage medium of claim 19; and a processor operable to execute the instructions.

* * * * *